COMPUTER DATA MERGING SYSTEM

Filed May 19, 1955 19 Sheets-Sheet 1

INVENTORS:
Myron J. Mendelson
Alfred Doig, Jr.
Richard E. Sprague

Earl Beust
By Louis A Kline
John J. Matlago, Agent
Their Attorneys.

INVENTORS
Myron J. Mendelson
Alfred Doig, Jr.
Richard E. Sprague
By Earl Bernst
Louis A Kline
John T. Matlago, Agent
Their Attorneys.

INVENTORS:
Myron J. Mendelson
Alfred Doig, Jr.
Richard E. Sprague

By [signatures]
their Attorneys

Fig. 9

| | Flip-flops V1 | Flip-flops V2 | |
|---|---|---|---|
| Read head "1" (1 word entry) | 0 | 0 | $V_1' V_2'$ |
| Read head "2" (2 word entry) | 0 | 1 | $V_1' V_2$ |
| Read head "4" (4 word entry) | 1 | 0 | $V_1 V_2'$ |
| Read head "8" (8 word entry) | 1 | 1 | $V_1 V_2$ |

Fig. 10

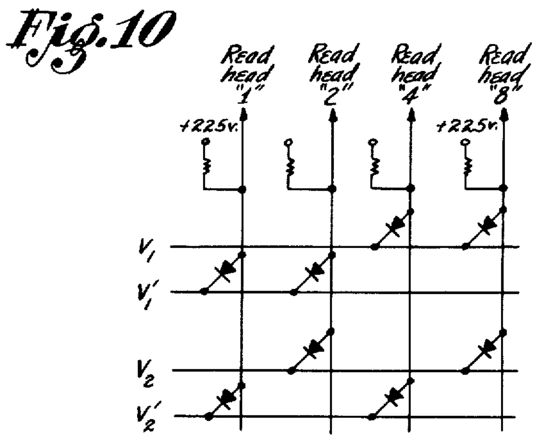

Fig. 11

| | Entry Length Code | | | | | | | | | | | |
|---|---|---|---|---|---|---|---|---|---|---|---|---|
| | E Register (Prior to PC#342) | | | | | | Flip-flops A1-A6 (Set up in PC#341) | | | | | |
| | $0_1$ | | | $0_0$ | | | | | | | | |
| | $P_2$ | $P_1$ | $P_0$ | $P_2$ | $P_1$ | $P_0$ | A6 | A5 | A4 | A3 | A2 | A1 |
| For 1 word entry | 0 | 0 | 0 | 0 | 0 | 0 | 0 | 0 | 0 | 0 | 0 | 0 |
| For 2 word entry | 0 | 0 | 0 | 0 | 0 | 1 | 0 | 0 | 0 | 0 | 0 | 1 |
| For 4 word entry | 0 | 0 | 0 | 0 | 1 | 1 | 0 | 0 | 0 | 0 | 1 | 1 |
| For 8 word entry | 0 | 0 | 0 | 1 | 1 | 1 | 0 | 0 | 0 | 1 | 1 | 1 |

INVENTORS:
Myron J. Mendelson
Alfred Doig, Jr.
Richard E. Sprague

By Earl Benet
Louis A. Kline
John J. Matlago
their Attorneys

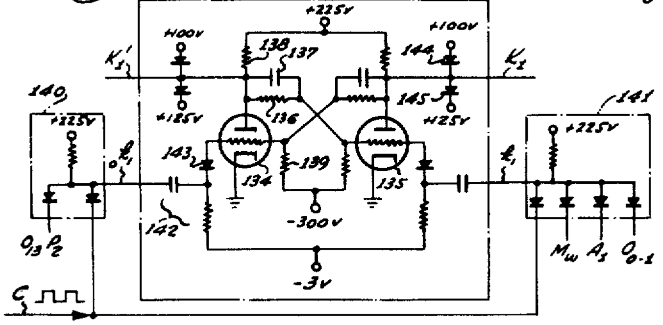

Fig. 12

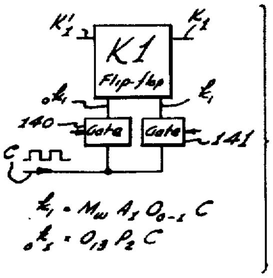

Fig. 13

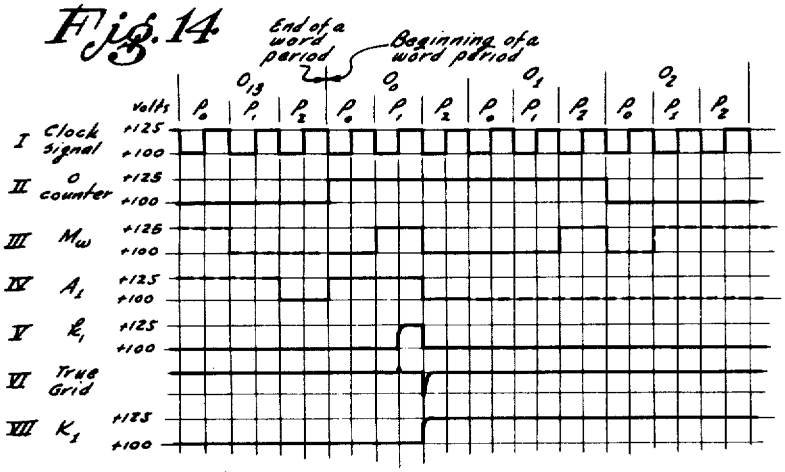

Fig. 14

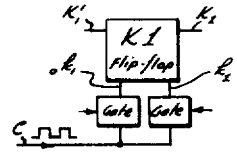

Fig. 25

| | |
|---|---|
| Look up first SCW | $k_1 = {}^{\#}343(M_w H_2' + M_w' H_2) O_{8-9} C$<br>$_0k_1 = {}^{\#}343\ O_2 C$ |
| Look up first word of entry | $k_1 = ({}^{\#}346 + {}^{\#}353)\{[M_w(A_1 + H_2') + M_w' A_1' H_2](A_1 O_{4-5} + A_1 O_{8-9})\} C$<br>$_0k_1 = ({}^{\#}346 + {}^{\#}353) O_{13} P_2 C$ |
| Look up first word of entry in J register | $k_1 = ({}^{\#}347 + {}^{\#}354 + {}^{\#}357) M_w A_1 O_{0-1} C$<br>$_0k_1 = ({}^{\#}347 + {}^{\#}354 + {}^{\#}357) O_{13} P_2 C$ |
| Look up SCW in J register | $k_1 = {}^{\#}350(M_w H_2' + M_w' H_2) O_4 C$<br>$_0k_1 = {}^{\#}350\ K_1 O_{13} P_2 C$ |
| Look up record address | $k_1 = {}^{\#}356(M_w H_2' + M_w' H_2) O_{0-1} C$<br>$_0k_1 = {}^{\#}356\ O_{13} P_2 C$ |
| Compare: \|K\|>\|J\| \|E\|<\|J\| | $k_1 = {}^{\#}351\ F_2 E_2 J_2' C$<br>$_0k_1 = {}^{\#}351\ F_2 E_2' J_2 C$ |
| Test for terminating conditions | $k_1 = {}^{\#}360\ A_9' A_{10}' A_n' O_{13} C$<br>$_0k_1 = {}^{\#}360\ O_{13} P_2 C$ |

INVENTORS:
Myron J. Mendelson
Alfred Doig, Jr
Richard E. Sprague
By Ugal Beust
Louis A Kline
John T. Matlago, Agent
Their Attorneys.

INVENTORS:
Myron J. Mendelson
Alfred Doig, Jr.
Richard E. Sprague
By Earl Benst
Louis A Kline
John J. Matlago, Agent
Their Attorneys.

INVENTORS:
Myron J. Mendelson
Alfred Doig, Jr.
Richard E. Sprague
By Earl Bernst
Louis A. Kline
John J. Matlago, Agent
Their Attorneys.

INVENTORS
Myron J. Mendelson
Alfred Doig, Jr.
Richard E. Sprague
By John J. Matlago, Agent
Their Attorneys

COMPUTER DATA MERGING SYSTEM

Filed May 19, 1955 19 Sheets-Sheet 9

INVENTORS:
Myron J. Mendelson
Alfred Doig, Jr.
Richard E. Sprague
By Earl Bennett
Louis A. Kline
John T. Matlago, Agent
Their Attorneys.

INVENTORS:
Myron J. Mendelson
Alfred Doig, Jr.
Richard E. Sprague

By Carl Berger
Louis A. Kline
John T. Matthews, Agent
The Attorneys

INVENTORS:
Myron J. Mendelson
Alfred Doig, Jr.
Richard E. Sprague

By Earl Bennett
Louis A. Kline
John J. Matlago, agent
Their Attorneys

INVENTORS
Myron J. Mendelson
Alfred Doig, Jr.
Richard E. Sprague
By Earl Berest
Louis A Kline
John J. Marlago, Agent
Their Attorneys.

COMPUTER DATA MERGING SYSTEM

INVENTORS:
Myron J. Mendelson
Alfred Doig, Jr.
Richard E. Sprague

By John T. Maclago, Agent
Their Attorneys.

INVENTORS:
Myron J. Mendelson
Alfred Doig, Jr.
Richard E. Sprague
By Earl Bennett
Louis A. Kline
John T. Matlago, Agent
Their Attorneys.

COMPUTER DATA MERGING SYSTEM

Filed May 19, 1955

$k_1 = \{(M_w H_2' + M_w' H_2)(\#343\, O_{8-9} + \#350\, O_4 + \#356\, O_{0-1}) + (\#346 + \#353)[M_w(A_1 + H_2') + M_w' A_1' H_2](A_7' O_{4-5} + A_7 O_{8-9})$ $+ (\#347 + \#354 + \#357) M_w A_1 O_{0-1} + \#351\, F_2 E_2 J_2' + \#360\, A_9' A_{10}' A_{11}' O_{13}\} C$ ${}_0k_1 = [\#343\, O_2 + (PCS4 + \#356 + \#350\, K_1) O_{13} P_2' + \#351\, F_2 E_2' J_2] C$

INVENTORS:
Myron J. Mendelson
Alfred Doig, Jr.
Richard E. Sprague

Pearl Benst
By Louis A Klein
John J. Matlago, Agent
Their Attorneys.

INVENTORS:
Myron J. Mendelson
Alfred Doig, Jr.
Richard E. Sprague
By Earl Bennett
Louis A Kline
John J. Matlago, Agent
Their Attorneys.

INVENTORS:
Myron J. Mendelson
Alfred Doig, Jr.
Richard E. Sprague

Carl Benst
Louis A Kline
By John J. Matlago, Agent
Their Attorneys

Fig. 30

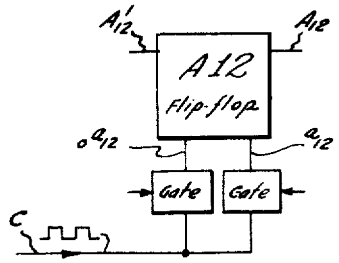

| | |
|---|---|
| Add one to H register | $a_{12} = \#357\ A_1'\ O_0\ P_0\ C$ <br> ${}_0a_{12} = \#357\ A_1\ O_0\ P_0\ C$ |
| Add entry length to H register | $a_{12} = \#360 A_2'[A_1(O_{0-1} + A_7 O_{4-5} + A_7' O_{8-9}) + A_1' O_3 P_2 + A_1 O_7 P_2]C$ <br> ${}_0a_{12} = \#360\ A_{12} H_2' C$ |
| Identify sort control word | $a_{12} = (\#353\ K_1' + \#354)\ A_{11}'\ O_{13} P_2 C$ <br> ${}_0a_{12} = (\#353\ K_1 + \#354 A_{11})\ O_{13} P_2 C$ |

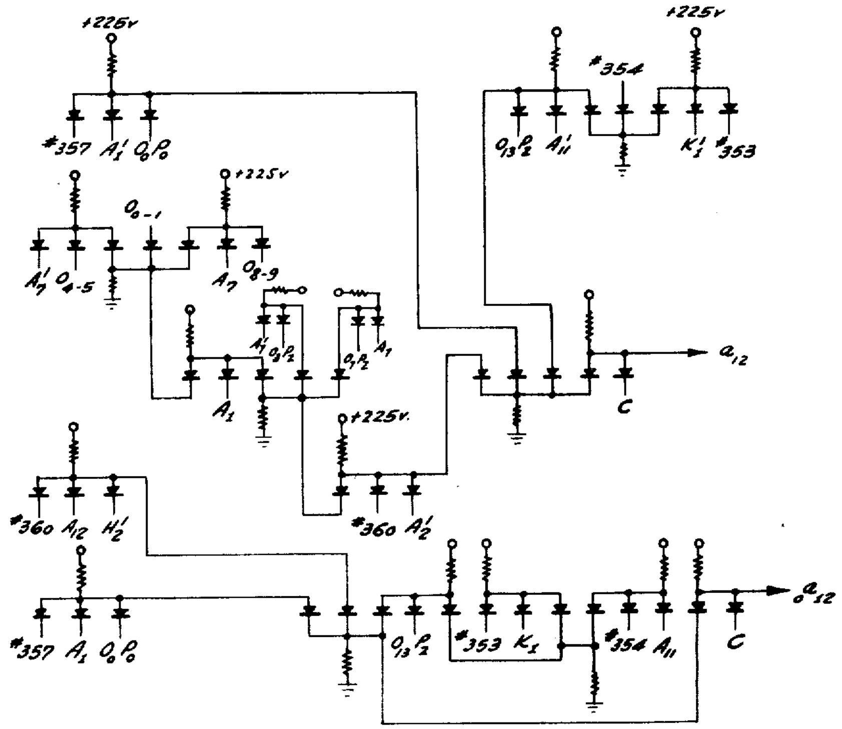

$$a_{12} = \{\#357 A_1' O_0 P_0 + \#360 A_2'[A_1(O_{0-1} + A_7 O_{4-5} + A_7' O_{8-9}) + O_3 P_2 + O_7 P_2] + (\#353 K_1' + \#354) A_{11}' O_{13} P_2\} C$$

$${}_0a_{12} = [\#357 A_1 O_0 P_0 + \#360 A_{12} H_2' + (\#353 K_1 + \#354 A_{11}) O_{13} P_2] C$$

INVENTORS:
Myron J. Mendelson
Alfred Doig, Jr.
Richard E. Sprague
Pearl Beust
Louis A Kline
By John T. Maclago, Agent
Their Attorneys $H_0 = PCS2\ H_2 + {}^{\#}360(A_{12}H_2' + A_{12}'H_2)$ $J_0 = PCS3\ J_2 + ({}^{\#}347 + {}^{\#}354)M_1$ $E_0 = PCS1\ E_2 + {}^{\#}344M_1 + {}^{\#}354(A_{12}'E_2 + A_{12}J_2)$ $F_0 = (PCS2 + {}^{\#}360)F_2$ $G_0 = (PCS2 + {}^{\#}360)G_2$ INVENTORS:
Myron J. Mendelson
Alfred Doig, Jr.
Richard E. Sprague
Heard Benest
By Louis A Kline
John J. Matlago, Agent
Their Attorneys.

United States Patent Office 2,947,976

Patented Aug. 2, 1960

2,947,976

COMPUTER DATA MERGING SYSTEM

Myron J. Mendelson, Los Angeles, and Alfred Doig, Jr., Culver City, Calif., and Richard E. Sprague, New Canaan, Conn., assignors to The National Cash Register Company, Dayton, Ohio, a corporation of Maryland Filed May 19, 1955, Ser. No. 509,475

13 Claims. (Cl. 340—174)

This invention relates to means for merging sorted groups of entries in the cyclical memory of a digital computer and more particularly to means integral with the computer to determine the relative magnitude of such entries and to arrange them in order of magnitude in a single group in the memory.

In accounting operations, groups of items of information, each item comprising data referring to a specific business transaction, are often required to be sorted in accordance with one datum in the items. Where a digital computer is employed to handle the items, they are programmed as "entries" into the memory of the computer in successive storage registers in accordance with the sequence in which they are received. Where, for example, two groups of entries are received by the computer at different times, upon completion of the sorting operation, each sorted group may occupy successive storage registers in a separate channel in the memory. It is frequently desired that the sorted groups be merged to form a third sorted group situated in the memory in a channel or, if required, in a plurality of sequential channels.

It has heretofore been known that entries of this type could be merged by means of equipment external to the computer. Such equipment requires that the entries be read out of the computer and encoded, for example, on a tape to be used as a basis for the merging operation. The tape is inserted into the merging equipment which, through its operation, produces another tape with the entries merged in sorted sequence. Quite often this system requires considerable production and processing of intermediate tapes involving time and expense and subject to error by operating personnel.

Accordingly, the present invention eliminates the need for merging equipment external to the computer by providing a system which is an integral part of the computer. Broadly, this system presumes that the entries of each of two groups are located preferably in separate memory channels and access to the entries may be made by reference to a previously conducted sort such as described in a co-pending application entitled "Computer Sorting System," Mendelson et al., Serial No. 487,172, filed January 21, 1955 and now abandoned. In other words, the entries may be read from a channel in sequence of magnitude of the relevant sorting datum, with the entry containing the smallest sorting datum first. The system comprises means to determine the magnitude of the datum in an entry of one channel relative to the same datum of an entry in the other channel, and means to record the entry with smallest sorting datum in other channels of the computer memory. This process will hereinafter be referred to as a merge; and, as will be shown, one or a plurality of merges may be carried out by the computer in the form of a merge routine initiated by programming a merge command into the computer. Further, a merge operation will be defined as the process of merging two groups of sorted entries to form one group, and thus may comprise a plurality of merge routines.

As is customary in programming a digital computer, the entries are each made to occupy the same number of successive storage registers of a memory channel, that is, an "entry" is herein defined as representing a serial array of binary coded information occupying one or a plurality of storage registers. Since a storage register can store a "word," an entry can comprise one or a plurality of binary-coded computer words.

Briefly, in the present invention, the word with the sorting datum (sort control word), which comprises a part of the first entry in a first channel to be considered, is set up by the computer arithmetic unit in a one-word recirculating register by arranging the binary digits stored by the recirculating register to correspond to those of this sort control word. A multi-word recirculating register is set up to contain the first entry in a second channel to be considered. An arrangement of networks in the arithmetic unit then compares the digits of these recirculating registers. The comparisons are made only for those digit positions of the words which are occupied by the sorting datum. A first flip-flop circuit is set to indicate the results of this comparison.

If the flip-flop circuit indicates that the sorting datum in the multi-word recirculating register is the smaller in magnitude, the entry therein is read back into a third channel of the memory, with the original sequence of words preserved.

If the flip-flop circuit indicates that the sorting datum in the one-word recirculating register is the smaller in magnitude, the sort control word of the entry in the multi-word recirculating register is transferred to the one-word register and the entry corresponding to the sort control word previously in the one-word register is set up in the multi-word recirculating register as it is in the memory. This entry is then read back into the third channel of the memory with the original sequence of words preserved. A second flip-flop circuit is set to indicate each time this type of transfer takes place between the two recirculating registers, thereby also indicating the origin of a recorded entry as the first or second channel.

If the first flip-flop circuit indicates that the two sets of sorting datum are equal in magnitude, the entry corresponding to the sort control word originally from either the first or second channel may be selected to be recorded back into the memory. Means are provided to select the same origin for every case of equality, thereby preserving any other sort already characterizing the entries, whether made with reference to the same sorting datum or to a different sorting datum. In the event the sort control word of the entry to be recorded is set up in the one-word recirculating register, means are provided to transfer the sort control word in the multi-word recirculating register to the one-word recirculating register prior to routing the entry to be recorded into the multi-word recirculating register.

The preceding processes are repeated until an entry which has been merged by the merge routine is identified as the last in either the first or second channels or until the last recording address in the third channel has been used. It is noted in this connection that the last entry (or entries) of one of the channels may be omitted from the merge after one merge routine has been terminated. It should be obvious that these entries may be included in the final sequence of merged entries by, for example, programming the computer to sequentially transfer them to the third channel.

In this manner, extensive sorting operations can be facilitated by successive mergings of large groups of sorted information. For example, in an inventory record system for a large department store, four channels of the computer may be filled from magnetic tape each with cash register receipt information of a different department. A merging operation with respect to stock number can be carried out twice until two pairs of memory channels have been used to store the merged data. The two pairs of channels can then be merged into one group of sorted information, four channels in length, and re-recorded on the tape. This entire process may be continuously repeated for other tapes received while the process is in progress until the end of the sales day and all cash register tapes have been entered. The resulting tape or tapes thus presents all of the day's transactions sorted in accordance with stock number. The computer may then be programmed to total the number of sales relevant to a particular stock number and inventory control records may be modified to correspond. Thus a cumulative system is provided for efficient merging operations in commercial transactions.

It may be noted that an object that this process achieves is the elimination of intermediate steps external to the computer otherwise required for merging presorted groups of entries.

A second object of this invention is to minimize time, effort, and chance of error in effectuating the merging of a considerable number of entries. A prominent feature of the invention with regard to this object is the processing of the entries in an orderly fashion as required by the organization of information in such auxiliary memory systems such as punched paper or magnetic tapes.

Another object of the invention is to provide a computer merging system which does not affect the original position of entries in the computer memory, and which reproduces the entries in merged order in another portion of the memory.

Yet another object of this invention is to provide means for expanding a sorting system by merging presorted groups of entries, thereby emphasizing the automatic features of the sorting system, and consequently increasing its scope and utility.

Another object of this invention is the provision of means which permit the operator to program the computer such that the sorting data in accordance with which the merging routine is to be done may be located anywhere in the entry.

A further object of the invention is the provision of circuitry operable in a plurality of preselected modes, one mode corresponding to each of a plurality of entry lengths capable of being handled by the computer. A feature in this connection is the inclusion of a buffer register, the capacity of which may be set to accord with any of the modes.

A still further object of this invention is to provide a system internal in a digital computer to accomplish a merging operation in accordance with the basic principles of logical design upon which other operations of the computer are based.

Other objects and many of the attendant advantages of this invention will become readily appreciated as the same becomes better understood by reference to the preferred embodiment detailed in the following description and the accompanying drawings wherein:

Fig. 9 is a table showing the states assumed by flip-flops V1 and V2 for selection of a read head in the J buffer register.

Fig. 10 is a circuit diagram of the matrix for read head selection in the J buffer register.

Fig. 11 is a table showing the coding in the first two octal periods of the E recirculating register and in flip-flops A1 to A6 for different entry lengths.

Fig. 12 is a schematic diagram of flip-flop K1.

Fig. 13 is a block diagram of flip-flop K1 together with the logical equations defining its operation during PC#347.

Fig. 14 is a graph of the waveforms describing the triggering of the K1 flip-flop during PC#347.

Figs. 15*a* to 15*e* show the portion of the functional flow diagram of the computer which accomplishes merging.

Figures 16, 17, 18, 19, 20, 21:
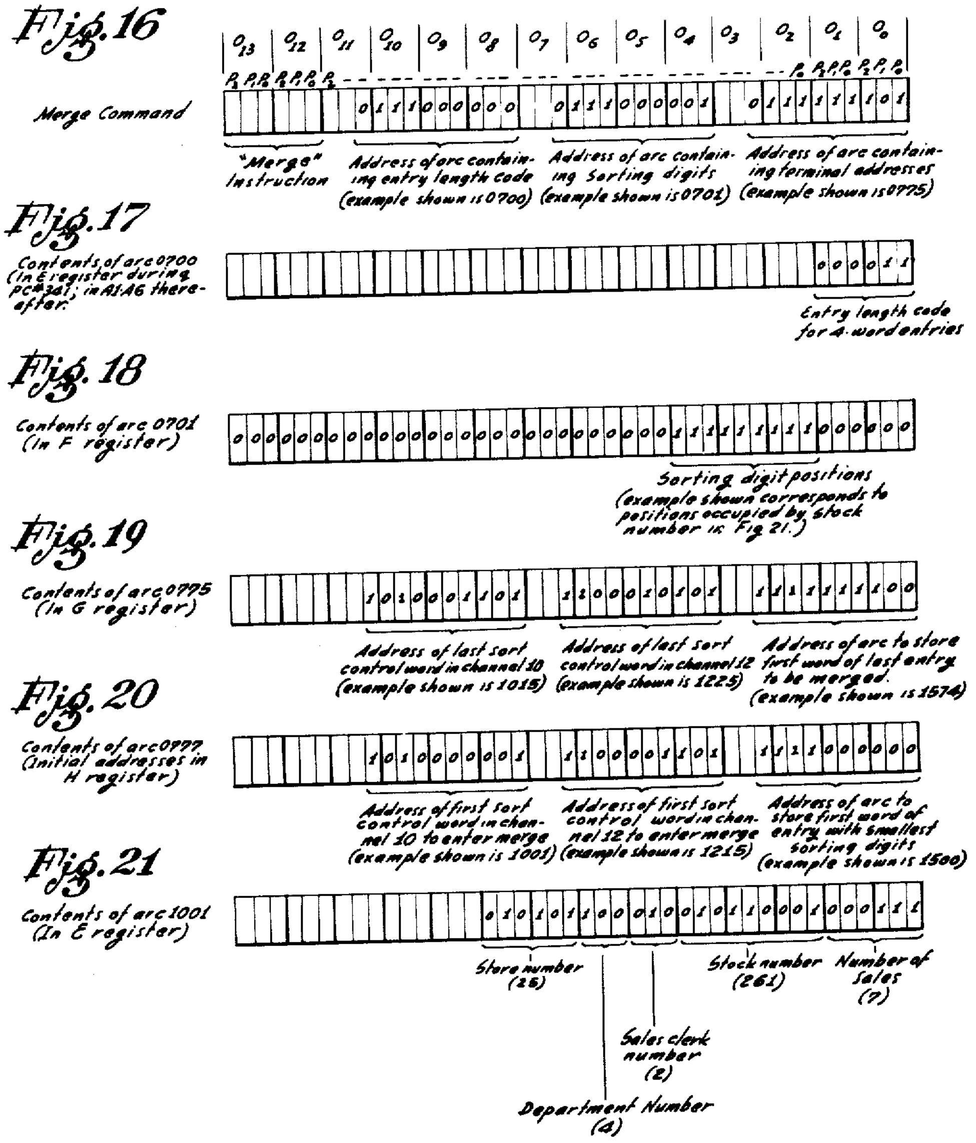

Fig. 16 is an example of the arrangement in the H register of a merge command.

Fig. 17 is an example of the arrangement in the E register of the entry length code for four words.

Fig. 18 shows an example of the arrangement in the F recirculating register of the code defining the binary positions of a word over which sorting is to be done.

Fig. 19 shows an example of the arrangement in the G recirculating register of terminal addresses.

Fig. 20 shows an example of the arrangement in the H recirculating register of initial addresses.

Fig. 21 shows an example of the arrangement in the E recirculating register of a sort control word.

Figure 22:
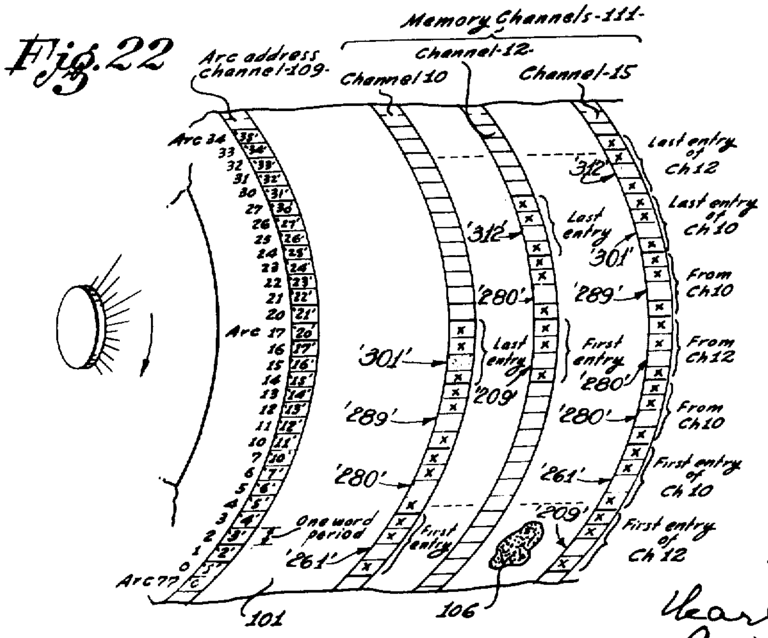
Figure 23:
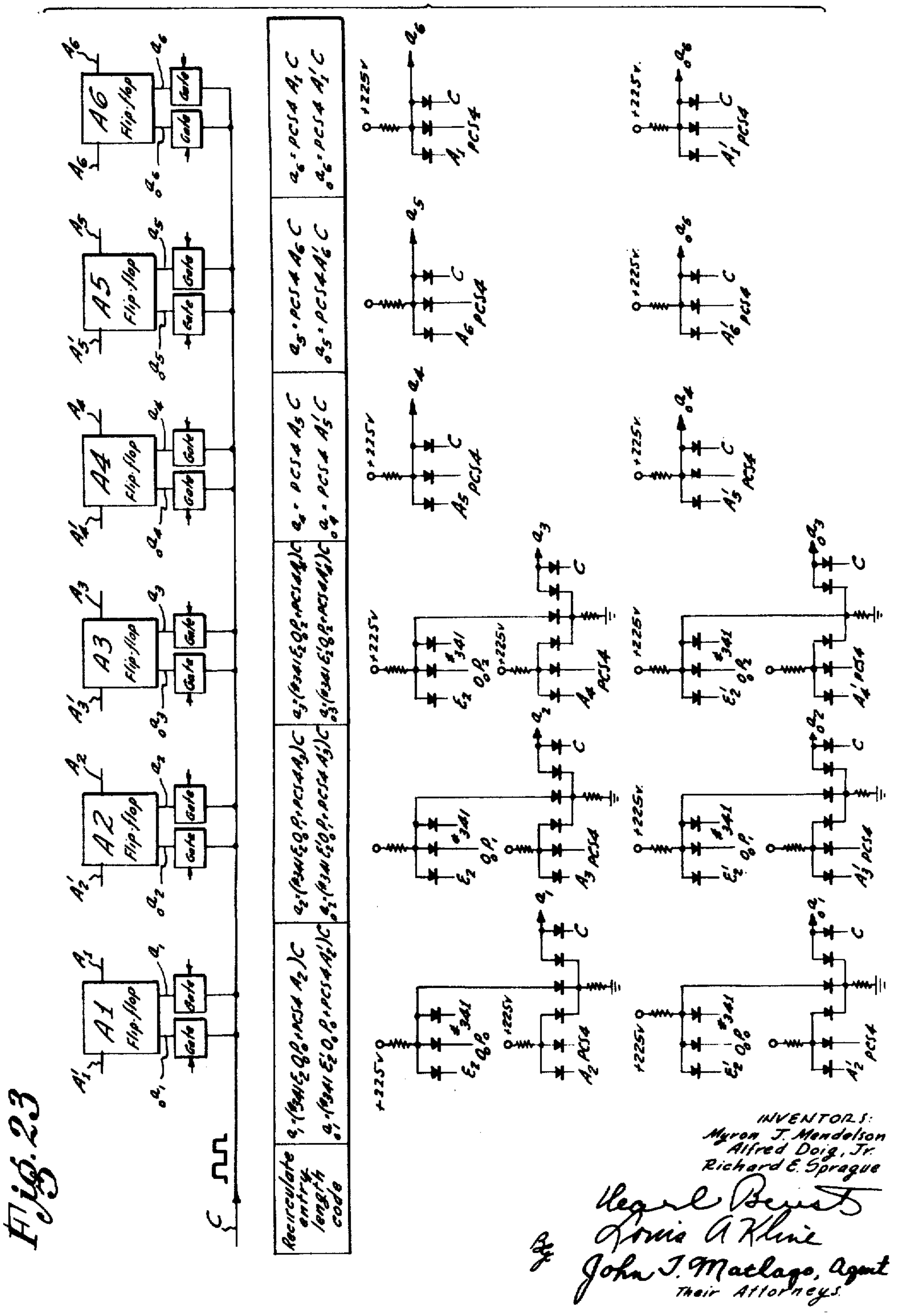
Figure 24:
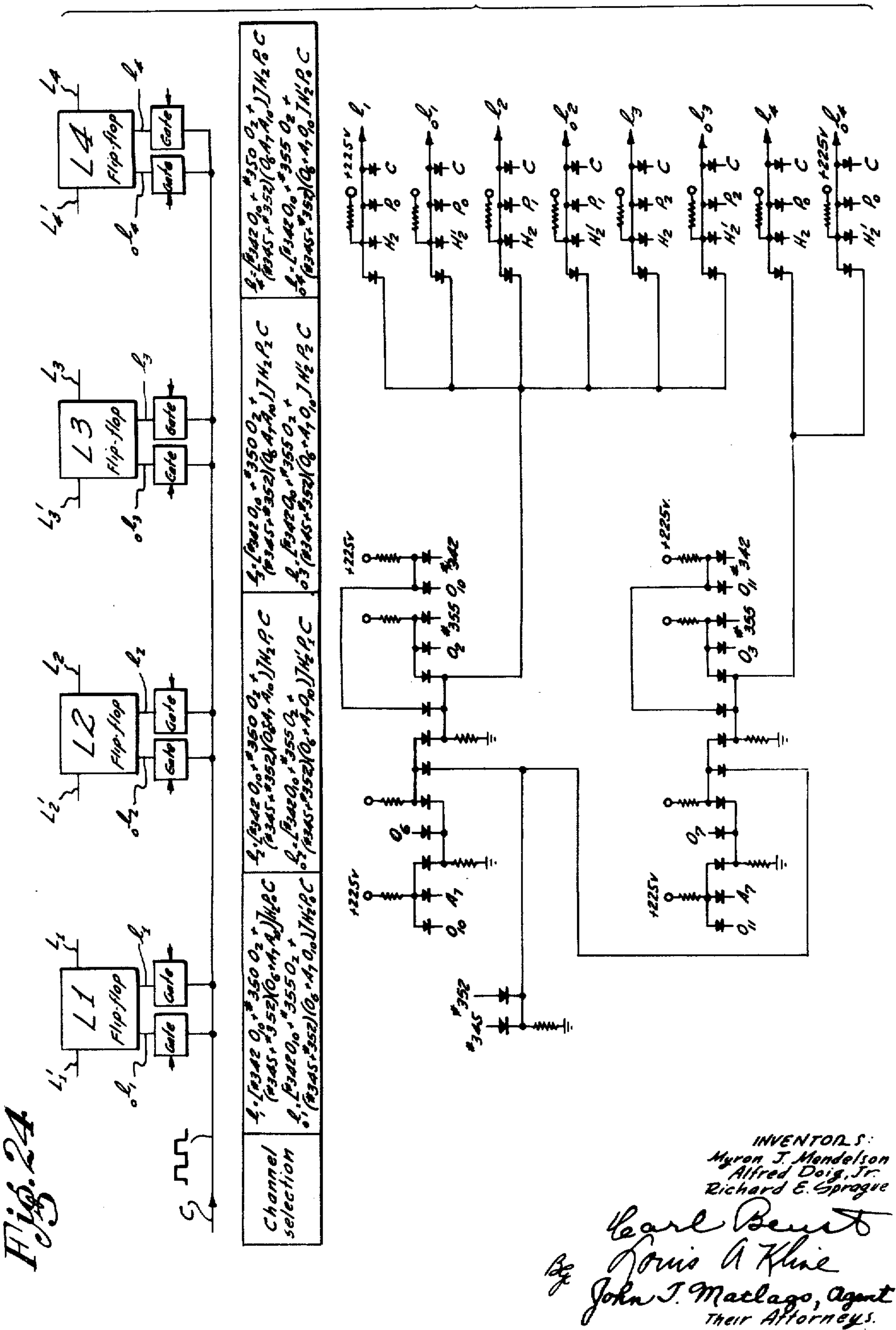

Fig. 22 is an illustration depicting the arrangement of information on the computer drum for a particular merging problem.

Figs. 23 to 27 and 29 to 31, respectively, show block diagrams of flip-flops A1 to A6, L1 to L4, K1, A7, A9, A10, A11, R1, A12, V1 and V2, together with their logical equations and triggering diode networks.

Figure 28:
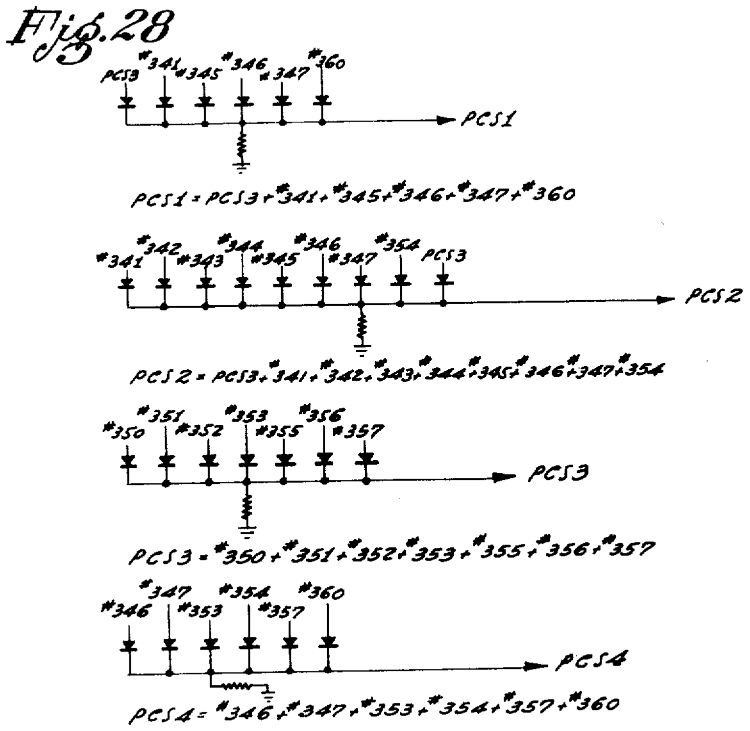

Fig. 28 shows the diode networks provided for generating the program counter sum logical propositions which render the required networks of the arithmetic unit effective during a word period.

Figs. 32 to 36, respectively, show the diode networks for generating the equations for propositions $H_0$, $J_0$, $E_0$, $F_0$, and $G_0$.

The preferred embodiment of the present invention is herein disclosed as part of a general purpose computer such as described in a co-pending application, Serial No. 325,144, filed December 10, 1952. This specification and accompanying drawings will describe and illustrate in detail only such portions of the computer as are directly concerned with the present invention and are necessary to explain the principle and operation thereof.

Figure 1:
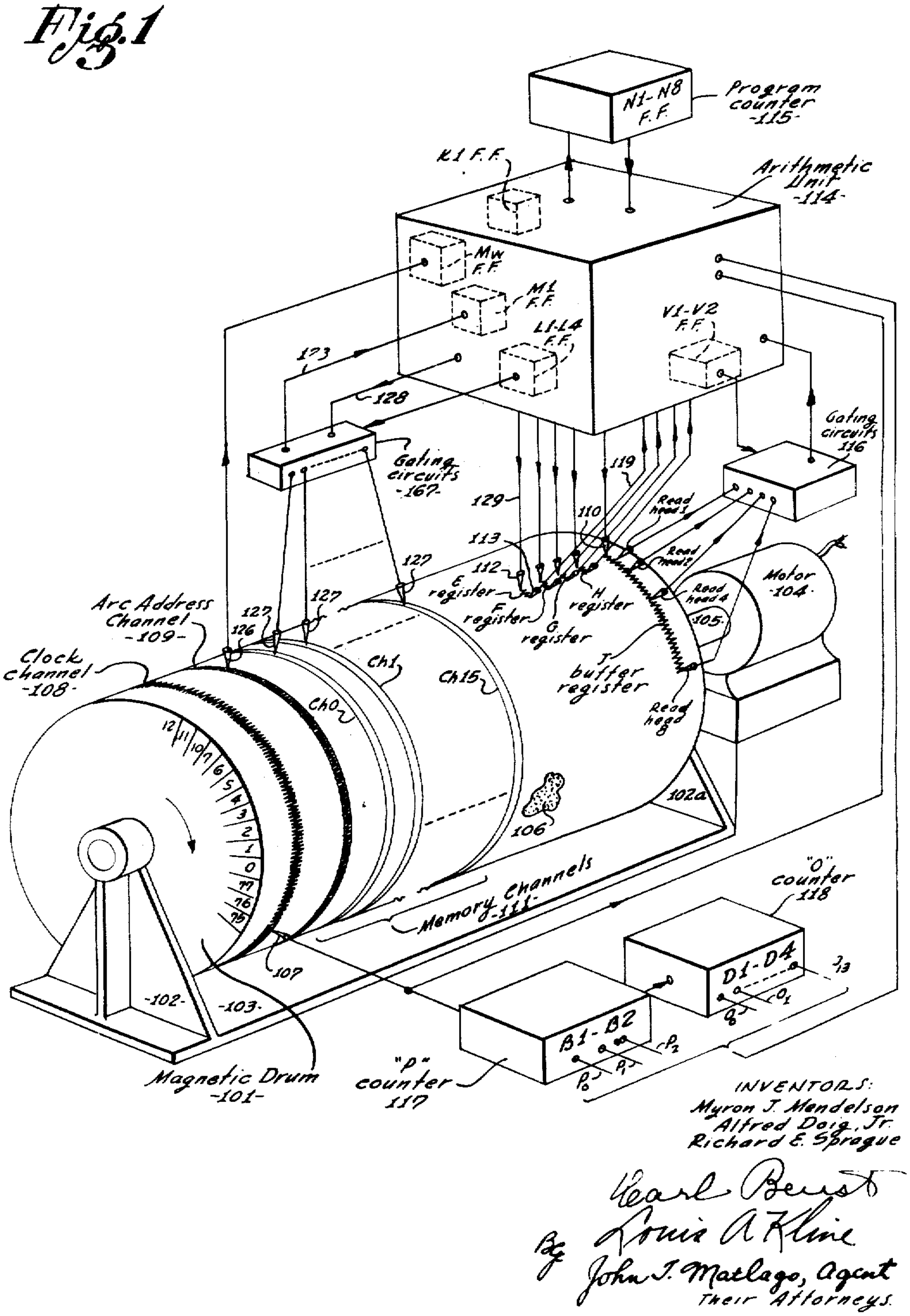
Fig. 1 is a perspective view illustrating the cooperative relationship of relevant portions of the computer system exemplifying the present invention.

Referring first to Fig. 1, a perspective view is shown of a computer incorporating the preferred embodiment of the invention.

Here is shown magnetic memory drum 101, supported on suitable arbor mounts 102 and **102*a* and a base plate 103. Drum 101 is rotated in a clockwise direction, as indicated by the arrow on its left end, by motor 104 driving through drive shaft 105. Deposited on the surface of drum 101 is a coating 106 of magnetic material, such as ferric oxide, which enables information to be stored as magnetic patterns thereon. Shown stationarily positioned to have a working relation with coating 106 are a plurality of sensing elements, such as head 107, which, as drum 101 revolves, define circumferential channels, such as clock channel 108**.

Commencing from the left end of drum 101, the first channel thus defined is designated clock channel 108 and the second channel is designated arc address channel 109. These two channels contain permanently recorded information. Next on drum 101 are the memory channels 111. The information in memory channels 111 is comprised of computer "words" as hereinafter described. Toward the right end of drum 101 five more channels are defined on the drum. These channels are different from the others in that only a small arc on each is storing useful information at any given time. Also, this information is stored dynamically in that the moving arc serves as a medium for temporarily delaying information recorded thereon so that it can be picked up a fixed period later. As will be subsequently described, the combination of the delay obtained by this means, together with a delay obtained by a series of flip-flop circuits in arithmetic unit 114, constitute each of the loops referred to as the E, F, G, and H recirculating registers and the J buffer register. Each of these registers provides means for serially recirculating information through arithmetic unit 114 so that it can be operated upon.

Clock channel 108 completely circumscribes drum 101 and contains a permanently recorded magnetic flux pattern representing an electrical sine wave so as to form a closed loop. Each cycle of this sine wave defines an elemental memory area on the drum periphery on which a binary digit of information may be recorded. Thus the signals on clock channel 108 divide the drum circumference into a fixed number of such elemental areas; namely 2688 in this computer. Clock head 107 is stationarily positioned close to the drum periphery and senses the changes in magnetic flux pattern, thereby generating an electrical signal indicative of each sine wave cycle. In construction, clock head 107 is comprised of a split core of soft iron or a like conductor of magnetic lines of force, and a coil wound thereon, in which the electrical sine waveform is induced as the magnetic flux on drum 101 moves past the core gap. One terminal of the coil is grounded and the other terminal is connected to circuitry designed to shape the induced voltage to a symmetrical square wave form preliminary to causing it to serve as driving voltage for other components. Such circuitry (not shown) is well known in the art and generally comprises several stages of amplification, a pulse shaping circuit, a triggering circuit of the Schmitt type and a diode clamping arrangement. The resulting square wave, hereinafter designated clock signal C, has a period equal to that of the original sine wave and an amplitude clamped between +100 v. D.C. and +125 v. D.C. The time period between trailing edges of clock signal C will be designated as a clock period, and a differentiated signal generated by the abrupt fall of the trailing edge of the square wave clock signal C is employed to trigger the logical circuitry in the computer. It may be noted that clock signal C is also used to synchronize logical networks of arithmetic unit 114. It should be understood that all logical propositions in the computer operate at the same two voltage levels as clock signal C, i.e., +100 v. D.C. and +125 v. D.C.

It is by utilizing the signals induced by clock channel 108 as a reference during reading and recording that the computer effectively divides the other circumferential channels of drum 101 into a similar number of elemental memory areas and also synchronizes the operation of all circuits so that they operate in accordance with a basic timing logic. Each of these elemental memory areas on the periphery of drum 101 in the other channels shown in Fig. 1 is capable of containing a digit of binary information, i.e., a saturated flux pattern either in one direction or the other. When the flux is in one direction in a given elemental memory area, a binary digit "one" is represented; when it is in the other direction, a binary digit "zero" is represented. Since the non-return-to-zero method of storing information on the drum is employed, the recorded flux pattern changes for successive memory areas only when the binary digits of a sequence change from 0 to 1, or vice versa.

Computer components are designed to serially handle information in blocks consisting of a fixed number of binary digits. These blocks may represent either commands or numbers and are commonly referred to as "words." A word is comprised of a sequence of 42 consecutive binary digits and thus requires 42 consecutive memory areas for storage. The portion or arc of a circumferential channel in which a word may be recorded is designated a storage register. Since clock channel 108 contains 2688 clock signals, storage space or registers for 64 words (2688/42) are provided on each of the channels. Thus the circumference of drum 101 is divided into 64 arcuate registers. As shown on the left end of drum 101 in *Fig. 1*, each of these registers is designated by one of the reference numerals 0 through 77 (octal numbering system). The arcs are numbered consecutively in a counterclockwise direction, and it should be noted that arc 77 is followed directly by arc 0 such that the defined registers extend over the entire circumference of the drum. The time required for one arc to pass a head is designated as one word period, which is defined by 42 cycles of the sine wave passing clock channel head 107.

In order to enable arithmetic unit 114 to properly respond to each of the digits in a register being sensed at any given time, counting circuits comprised of P counter 117 and O counter 118 are provided for counting the clock pulses generated by clock head 107 and its associated circuitry. These counters, together, respond to a cycle of 42 clock pulses. Thus the overall counting cycle defines the period allotted to a register on the drum. P counter 117 responds directly to the signals induced in the clock head 107 and has a capacity of three clock pulse counts; namely, $P_0$, $P_1$, and $P_2$. A carry pulse generated once each cycle of P counter 117 causes O counter 118 to manifest a new count. Since the unit to which O counter 118 responds is represented by a period of three clock pulses, it can be thought of as counting or defining octal digits. It is well known in the computer art that a group of three binary digits together can be readily converted into their octal equivalent. This arrangement of counters divides each register into 14 octal digits; namely, $O_0$, $O_1$, . . . $O_{13}$, as manifested by signal outputs from O counter 118. Accordingly, by noting the counts in the P and O counters together, succeeding elemental memory areas of the arc, hereinafter to be designated "binary digit positions" or "pulse positions," are identified by the P and O counters as $O_0P_0$, $O_0P_1$, $O_0P_2$, $O_1P_0$, . . . $O_{13}P_2$. In summary, each word period is divided by this arrangement into fourteen O (octal) periods each of which is subdivided into three P (binary) positions and in each of the latter may be stored one binary digit of a binary-coded octal digit. Accordingly, by noting the counts of the P and O counters, the pulse position in an arc, or storage register, presently being scanned by the heads on drum 101 can be observed.

The means employed in the P and O counters to define any pulse position or combination of pulse positions of a word, so that circuitry in arithmetic unit 114 may be arranged to provide proper triggering for flip-flops as required by their respective equations, is well understood in the prior art. Thus, considering P counter 117, Fig. 1 indicates that two flip-flops, B1 and B2, are employed. The arrangement is a parallel one in that clock signal C is simultaneously applied to all gates associated with the inputs to these flip-flops. The interconnection of the outputs, however, allow themselves to be triggered by successive clock pulses only to change their states to indicate the P cyclical counts. Each of the counts $P_0$, $P_1$, and $P_2$ represents a different configuration of flip-flops B1 and B2. The arrangement for O counter 118 is similar, and each of the counts $O_0$, $O_1$, . . .

$O_{13}$ represents a different configuration of flip-flops D1 through D4. Depending upon the binary digit position of an arc to be represented, a particular configuration of each of the two groups B1—B2 and D1—D4 is routed to arithmetic unit 114 during each clock period, effectuating a different arrangement in a matrix type of diode network, effective output of which is used as an input to logical gates or mixers.

The configuration of computer words and the representation of numerals employed by the computer will next be discussed as preliminary to a description of the other channels of drum 101.

Figures 2, 3, 4, 5, 6, 7:
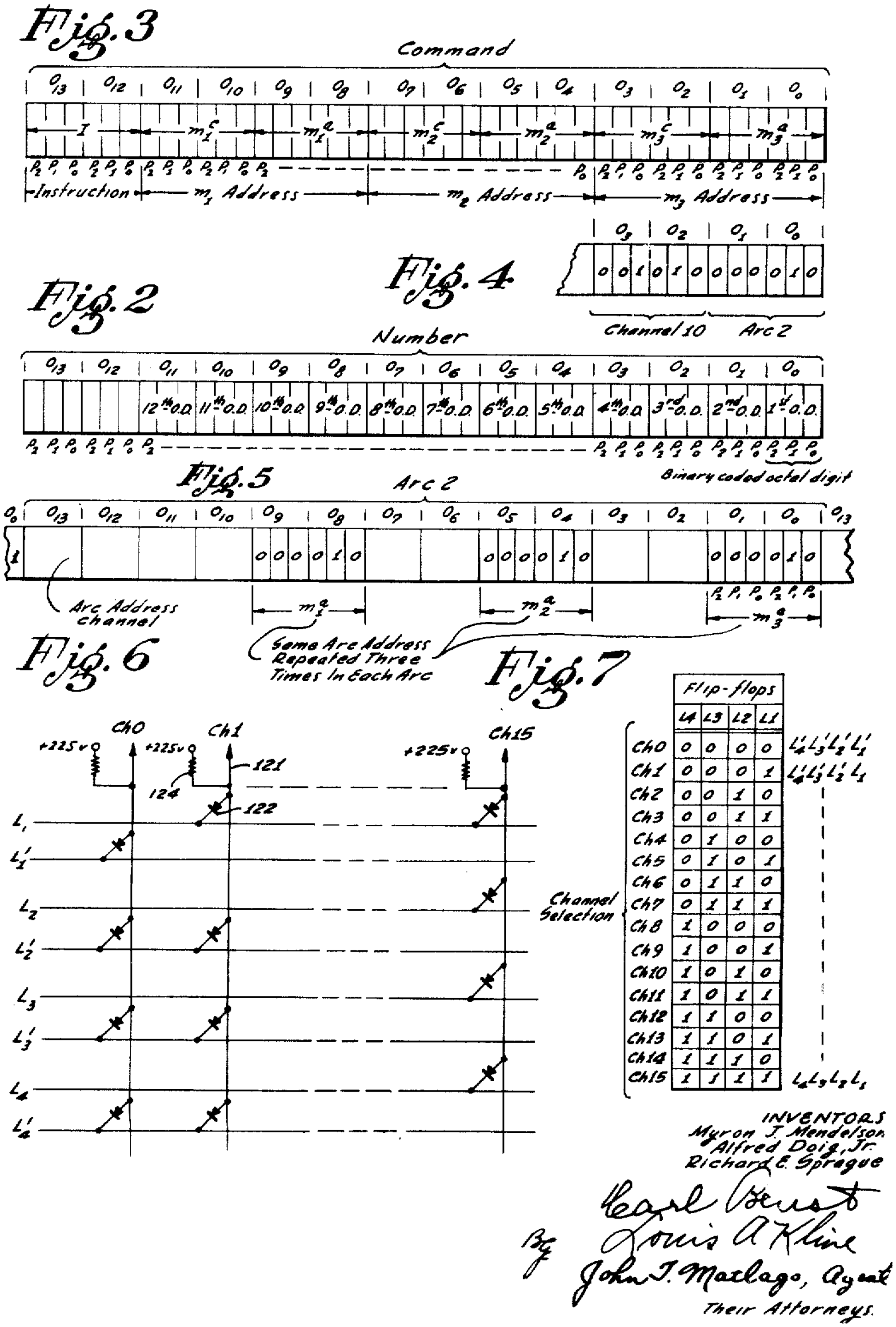
Fig. 2 shows a detail of the code pattern employed during a word period to represent a number.
Fig. 3 shows a detail of the code pattern employed during a word period to represent a command.
Fig. 4 shows an example of a particular memory address located in a portion of a command.
Fig. 5 shows a portion of the arc address channel and how the code pattern of the particular arc address is recorded thereon.
Fig. 6 is a circuit diagram of the matrix for channel selection.
Fig. 7 is a table showing the states assumed by flip-flops L1 to L4 for channel selection.

Referring to Fig. 2, a diagram showing the serial arrangement in a word period of information representing a number will be described. The word period of 42 clock periods is shown to be divided into 14 equal octal digit periods. Starting from the right, these periods are marked $O_0$ through $O_{13}$, respectively. Each of these octal periods is further divided into three binary digit positions marked $P_0$, $P_1$ and $P_2$. The present computer provides for operating on binary numbers 36 digits in length. Thus in the diagram the first binary digit position, defined by $O_0P_0$, represents the least significant binary digit of the number, and the $O_{11}P_2$ position represents the most significant binary digit. The $O_{12}$ and $O_{13}$ periods of this word contain coded information not relevant to the present invention.

In Fig. 3 the arrangement is shown for information in a word period representing a command. It should be noted that the word diagram here shown is divided into periods defined by the O and P counts, similarly to that in Fig. 2. The information in a command is generally defined by the notation (I, $m_1$, $m_2$, $m_3$) where $m_1$, $m_2$, and $m_3$ represent addresses (arc and channel) on the memory drum, and I corresponds to an instruction to be carried out by the arithmetic unit 114. Thus, in the diagram a command is shown to be divided into four sections. Starting from the right, the $m_3$ information is positioned in the periods defined by the octal counts $O_0$, $O_1$, $O_2$, and $O_3$; the $m_2$ information is positioned in the next four octal digit periods $O_4$ through $O_7$; and the $m_1$ information in the following four octal digit periods $O_8$ through $O_{11}$. The last two octal digit periods $O_{12}$ and $O_{13}$ are reserved for information corresponding to the instruction. Fig. 4 illustrates an example of how the address 1002 is set up in the $m_3$ portion of a command.

Referring next to Fig. 5, a diagram of a portion of arc address channel 109 (Fig. 1), defining in particular arc 2, is shown. In periods $O_{0-1}$, $O_{4-5}$, and $O_{8-9}$ of each of the arcs in arc address channel 109, signals corresponding to the binary number indication of the address of the next arc to pass heads 127 of memory channels 111 are permanently recorded. As will be detailed later, the binary digits read from arc address channel 109 are serially set up in flip-flop M*w*. It should be noted that the details of the circuitry for serially triggering flip-flop M*w*, in accordance with the magnetic pattern on arc address channel 109, has already been disclosed to the art. Briefly, the binary square wave pattern impressed in arc address channel 109 (Fig. 1) is sensed by head 126 and, due to differentiation thereby, presents pulses representing the leading and trailing edges of the square wave. These pulses are amplified, clipped, clamped between the limits +100 v. D.C. and +125 v. D.C., and applied to the grid input circuits of flip-flop M*w* through a diode gate such that the leading-edge pulse triggers flip-flop M*w* into one state and the trailing-edge pulse triggers flip-flop M*w* into the opposite state. The grid input circuit diode gates of flip-flop M*w* are synchronized with the clock pulses by application of clock signal C. These concepts will be further clarified later in connection with the convention adopted to present the computer logic. The output of flip-flop M*w* provides one of the inputs to diode network 125 of arithmetic unit 114, as will also be shown hereinafter.

Next in order from the left of drum 101 are memory channels 111. Memory channels 111 are each equipped with a stationary memory head 127, used for both reading and recording. Since information is always recorded into an arc of the main memory by reference to the O and P count signals, the information recorded in a register of memory channel 111 is always temporally aligned with the periods of the arcs already shown to be defined on drum 101 by arc address channel 109. As shown, information sensed by heads 127 is supplied to gating circuits 167 which control the connections thereof, permitting only one memory channel to communicate with arithmetic unit 114 at a time via lines 123 and 128. Gating circuits 167 operate in accordance with well-established principles as fully discussed in the referenced application, Serial No. 325,144.

Still referring to Fig. 1 and to the recirculating registers E, F, G, and H more particularly, it is noted that each of these recirculating registers has two heads associated with the drum memory, one for reading and the other for recording, arranged such that as drum 101 rotates, a portion of the drum surface will pass the record head first and the read head later. For example, the E register includes a record head 112 spaced along the drum surface from a read head 113. Thus, as far as the recirculating registers are concerned, only a small arcuate portion of the drum surface is used for storing information at a given time. This portion occupies an area equivalent to less than 42 elemental memory areas, and the information is delayed in arithmetic unit 114, regardless of whether or not it is modified, a given number of clock periods so that the normal recirculating time for each of these registers is 42 clock periods, i.e., one word period. These recirculating registers have their heads interconnected by way of the arithmetic unit 114 so that, for example, when the computer circuitry is set for recirculation in the E register, a particular binary digit signal on being recorded on the drum surface by record head 112 will be carried by the revolving drum 101 to read head 113, sensed thereby, transmitted to arithmetic unit 114 wherein the signal steps through flip-flop circuits, and is then retransmitted to record head 112 by which it is again recorded.

From Fig. 1 it may be seen that the J buffer register is also a recirculating register similar in every respect to those already discussed, but with the exception that provision is made for the recirculation therein, in the preferred computer, of one, two, four, or eight words. For this purpose four read heads are shown in cooperation with record head 110. Read head 1 is disposed to provide a one word period delay in a manner similar to the read heads of the one-word recirculating registers; read head 2 is disposed to provide a two word period delay; read head 4 is disposed to provide a four word period delay; and read head 8 is disposed to provide an eight word period delay. Gating circuits 116 function to select among the four read heads of the J buffer register and operate similarly to gating circuits 167.

Figure 8:
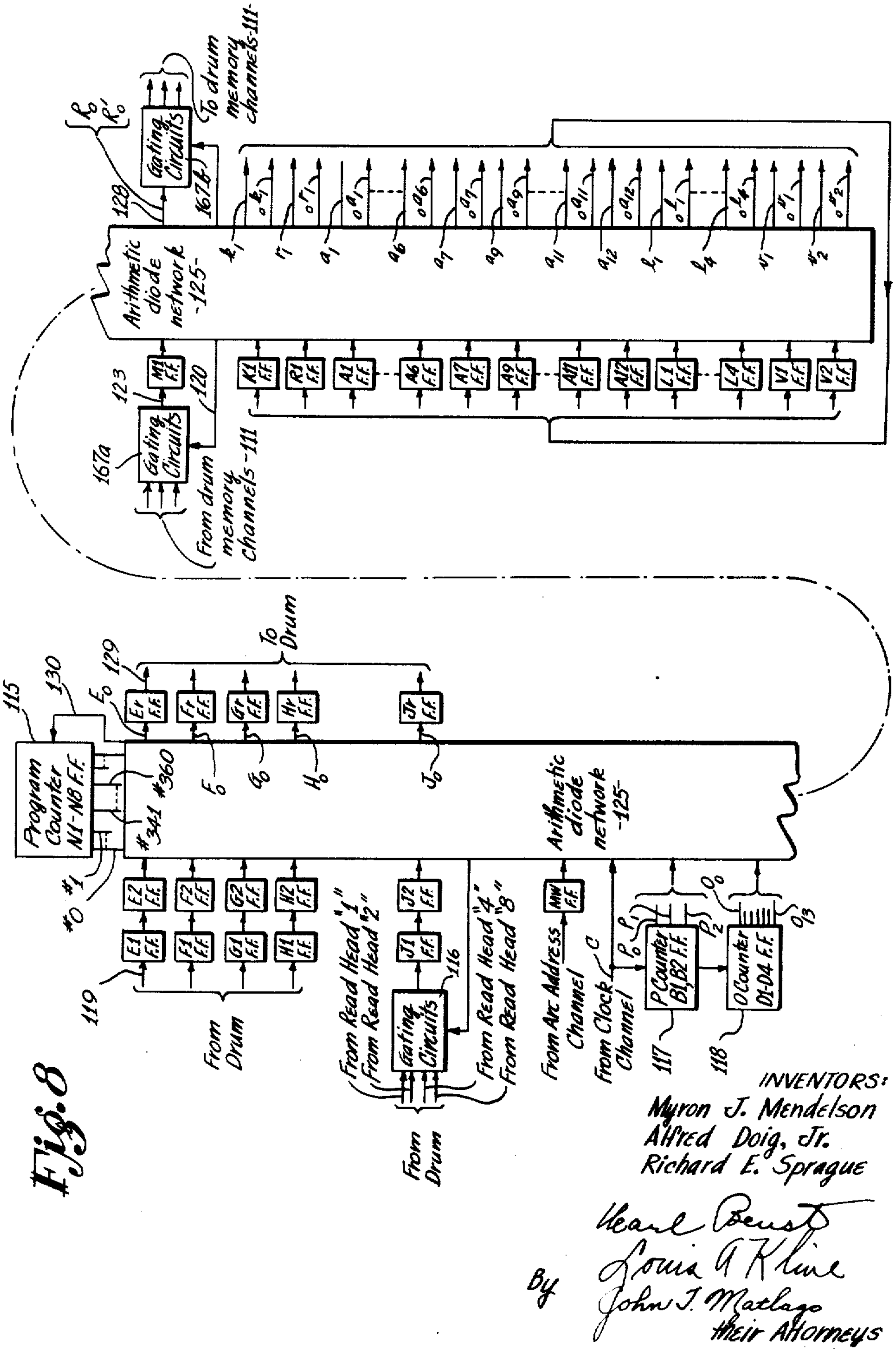
Fig. 8 is an overall diagram of the computer arithmetic unit showing relative inputs, outputs, and storage flip-flops.

It should be understood that the read and record circuitry for the recirculating registers, including the J buffer register, is well understood in the prior art. Briefly, as shown in Fig. 8, for the E register, for example, the output of diode network 125 of arithmetic unit 114, designated as proposition $E_0$, is a square wave clamped between +100 v. D.C. and +125 v. D.C., and is fed to the gating circuit of one grid of flip-flop E*r*. Proposition $E_0$ is also inverted and fed as proposition $E_0'$ (not shown) to the gating circuit of the other grid of flip-flop E*r*. Both grid gates are synchronized with clock pulses by clock signal C as heretofore mentioned. The outputs of flip-flop E*r*, namely, $E_r$ and $E_r'$, are represented by line 129 and are employed to energize record head 112. Nomenclature employed will be explained later.

Briefly, it should be noted that each of the E, F, G, and H recirculating registers and the J buffer register (when gating circuits 116 are set to pass information sensed by read head 1 only), as schematically shown in Fig. 1, normally operates so as to recycle information serially contained within a single word period. When they are each recirculating their information, the binary digits in corresponding binary digit positions of each of these registers travel in parallel around their respective loops once during each word period. It should be understood that the recirculation of information in the recirculating registers, and consequently the availability of this information to arithmetic unit 114, is independent of the communication of arithmetic unit 114 with memory channels 111. Furthermore, the operation of the recirculating register is synchronized with the arcs (word registers) on drum 101. Thus it is to be noted that arithmetic unit 114 is capable of simultaneously observing corresponding digits of a maximum of six different words, the five words contained in the recirculating registers and a word being read from a memory channel and received via line 123.

Referring now to Fig. 8 more particularly, a schematic diagram is shown of the relation of arithmetic unit 114 to other components of the computer relevant to the invention. Arithmetic unit 114 is comprised in the main of a diode network 125 which operates to interconnect the flip-flop circuits of the computer to route information and to perform digital processes on the information in accordance with specified sequences. As noted, the flip-flop circuits are the source of the binary terms which make up the logical equations by which computer operations are represented.

Flip-flop E*r*, F*r*, G*r*, H*r*, and J*r* are parts of the respective recirculating registers and respond to propositions $E_0$, $F_0$, $G_0$, $H_0$, and $J_0$ from diode network 125. These flip-flops serve to reconstruct and synchronize the signals derived from diode network 125 before recording them back onto drum 101.

Flip-flops E1, F1, G1, H1, and J1 are integrally parts of the E, F, G, and H registers and the J buffer register, respectively, and operate such that their outputs directly follow the information read from their respective channels on drum 101.

Flips-flops E2, F2, G2, H2, and J2 are also parts of the respective recirculating registers and serve to step information along to diode network 125.

Proposition $R_0$ is the record proposition which represents the entry to be recorded back into the memory. Proposition $R_0'$ is its logical inverse. These propositions are fed to gating circuits 167 via line 128.

Flip-flop R1, when true, serves to permit recording on a memory channel by opening gating circuit 167.

Flip-flop M1 operates to feed information from a selected memory channel into diode network 125 in accordance with techniques such as described in the reference application, Serial No. 325,144. Briefly, it may be pointed out that selection of a memory channel is made by gating circuits 167 as controlled by flip-flops L1 to L4. Information read from the selected memory channel is supplied via line 123 to flip-flop M1. The operation of flip-flop M1 is similar to that of flip-flop M*w* already discussed.

As will be subsequently described, the primary function of flip-flop K1 is to signal program counter 115 at the end of each word period to "count" to its next higher number, "skip" to a new number, or "stick" in the same number.

Flip-flops A1 to A6 function in the present invention as a cyclical store for the entry length code as will be shown. Information in these flip-flops recycles each two octal digit periods and when required is employed by observing the contents of flip-flops A1 and A2.

Flip-flops A9 to A11 function primarily to indicate, by means of results of a test performed and set up in each, whether or not a merge routine is to be terminated.

Flip-flop A12 functions to indicate that arithmetic unit 114 is sensing a sort control word.

Flip-flops L1 to L4 cooperate to inform gating circuits 167 to select a designated channel in the memory for recording or reading.

Flip-flops V1 and V2 cooperate to inform gating circuits 116 to select the output of a designated read head in the J buffer register.

In the present computer the processes performed are all divided into sequential step or time periods of one word length. This is the time required for information in the recirculating registers to recirculate once through arthimetic unit 114. Thus, each step operation defines a fixed serial operation performed by diode network 125 in arithmetic unit 114 during a word period.

It is the function of program counter 115 to render certain networks operable during each word period so as to accomplish each of these step operations. Accordingly, each output count signal, #0, #1, etc., of program counter 115 selects, i.e., renders operable, certain circuits of diode network 125 which respond to the desired inputs during each of the 42 clock periods of a word to generate the desired output propositions.

The cycle of 42 clock periods comprising a word period is determined by the timing circuits feeding into the left of diode network 125. These circuits include the clock pulses of clock signal C, signals from O counter 118, and signals from P counter 117. The counter outputs operate to break up the period of a word to render certain circuits effective only during certain portions of the word. In this way, the coded information in various positions of a word can be operated upon according to its significance.

Figure 15A:
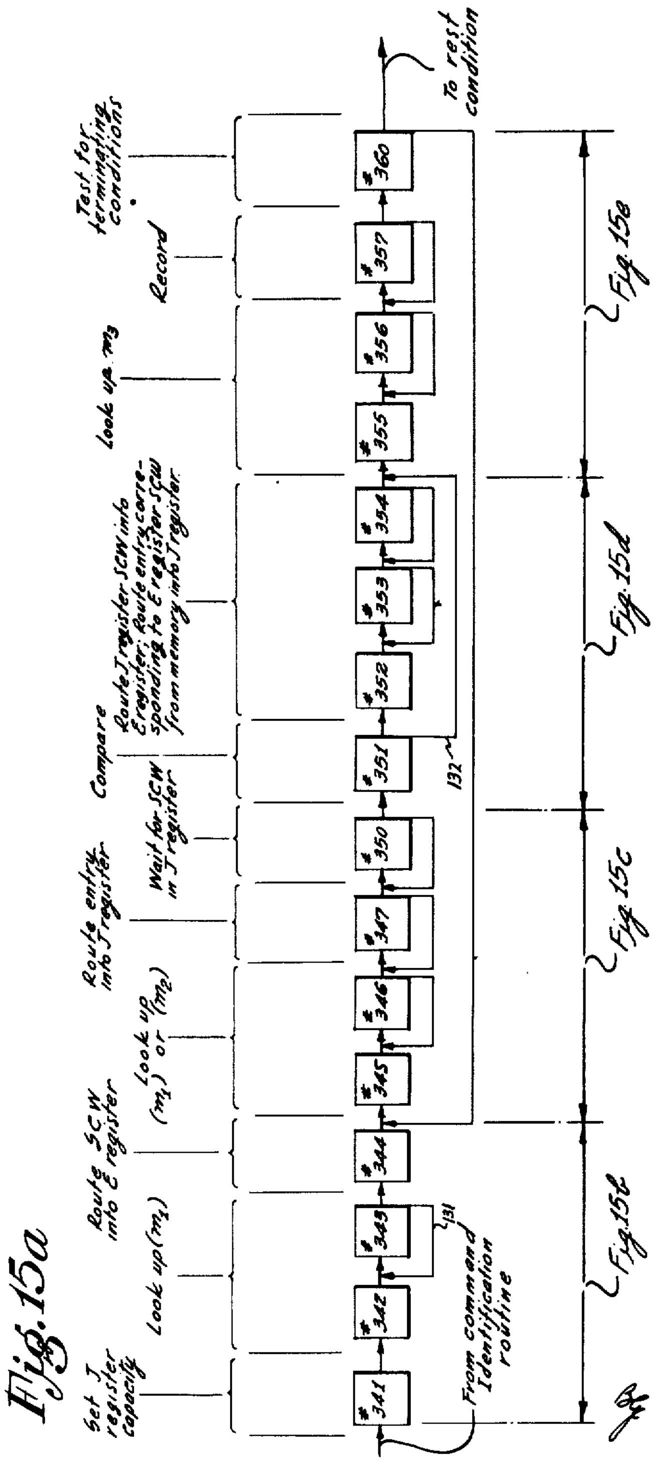

The content of program counter 115 is changed precisely at the end of each word period, as directed by the state of flip-flop K1 during the last binary digit position of each word period ($O_{13}P_2$), to cause other circuits to become operable during the next word period. Thus Fig. 8 shows that program counter 115 feeds its outputs into diode network 125 and is in turn controlled by output 130 (from flip-flop K1 controlled by diode network 125). Reference to Fig. 15*a* will clarify the action of program counter 115. This figure presents the portion of the computer flow diagram relevant to the merging process and shows how the step operations are arranged in sequence to merge when the coded command "merge" (Fig. 16) is programmed into the computer by the operator. As noted in Fig. 15*a*, each of the step operations is represented in the flow diagram by a block identified by a number, such as PC#341, of program counter 115. Each such block represents diagrammatically a set of logical operations to be performed serially by diode network 125 on information passing through arithmetic unit 114 during a single word period. The flow diagram extract shows how program counter 115 changes in content to automatically determine the order in which the one-word step operations are performed by the computer. The one-word step operations may repeat for several word times, depending on a binary decision; or one or another sequence may be carried out after a certain operation in a previous sequence causes a binary choice to be made. Generally, program counter 115 increases in content or "counts" in an orderly fashion as the one-word operations are sequenced from left to right on the flow diagrams. However, program counter 115 may have the same number content for more than one word, i.e., program counter 115 may "stick" in a given number as indicated, for instance, by line 131 associated with PC#343. Furthermore, program counter 115 may "skip" from one PC# to another, as indicated, for example, when it skips from PC#351 to PC#355 via line 132.

Whenever the horizontal output from a block is to be followed, program counter 115 counts to the next successive count, in Fig. 15*a*, for example, from PC#346 to PC#347 to PC#350 (program counter 115 counts octally). On the other hand, whenever a vertical output from a word block is to be followed, program counter 11 may be controlled so as to stick in the same count or skip to a different count not the next in succession.

It is the state of flip-flop K1 (Figs. 25 and 25a) at the $O_{13}P_2$ position of a word that determines which of the two courses program counter 115 will follow. If flip-flop K1 is false at $O_{13}P_2$, program counter 115 will count to the next higher number and the horizontal output from the block will be followed; if flip-flop K1 is true at $O_{13}P_2$, program counter 115 will stick or skip and the vertical output from the block will be followed. The state of flip-flop K1 at $O_{13}P_2$ is the result of a number of conditional processes, one of which occurs during every word period and which will be presented hereinafter.

Returning to Figs. 1 and 8, the circuitry corresponding to a particular count of program counter 115, as is well known in the art, is made effective in accordance with the states of the flip-flops N1 through N8. The arrangement adopted by the program counter is defined by trigger logical equations for each of the grids of flip-flops N1 through N8 in accordance with the various functions to be performed. The flip-flops are interconnected by a logical counting network causing them to operate as a binary counter whose outputs indicate PC#s. Since flip-flop K1 is controlled in turn by circuitry of arithmetic unit 114, it is apparent that mutual control occurs between program counter 115 and arithmetic unit 114.

Before considering further features of the computer circuitry concerned with the present invention, the convention of the logical methods employed herein will first be broadly outlined.

Logical propositions may be considered to be represented in circuitry by the states assumed by flip-flop circuits having two input lines and two output lines. The arrangement of such a circuit as used in the present invention will be explained by reference to Fig. 12. This circuit is designated as flip-flop K1 and its function will be completely described hereinafter. This flip-flop circuit utilizes a pair of triode tubes such as tube 134 and tube 135. When the flip-flop is in the condition such that tube 135 is cut off and tube 134 is conducting, it is considered to be "true" (or the flip-flop is said to be storing a binary "1"). When the flip-flop is in its other condition wherein tube 135 is conducting and tube 134 is cut off, it is considered to be "false" (or the flip-flop is said to be storing a binary "0"). It is thus understood that a flip-flop is generating two terms. These terms are represented by the flip-flop output lines which are connected to the plates of the tube and which are shown clamped at two operating potentials, +125 v. D.C. and +100 v. D.C. When the flip-flop is in a true state, the output line connected to tube 135 is at +125 v. D.C. while the output line connected to tube 134 is at +100 v. D.C. Similarly, when the flip-flop is in a false state, the output line connected to tube 134 is at +125 v. D.C., and the output line connected to tube 135 is at +100 v. D.C. In order to trigger the flip-flop, signals in the form of negative-going pulses are applied thereto on separate input lines coupled to the grid of each of the tubes in accordance with the convention that the grid of tube 135 must be pulsed in order to trigger the flip-flop into its true state, and that the grid of tube 134 must be pulsed in order to trigger the flip-flop into its false state.

The nomenclature employed herein uses the combination of a capital letter followed by a numeral or small case letter for designating a proposition flip-flop (K1, M*w*, etc.). The output of the flip-flop, which is at the high D.C. voltage (+125 v.) when the proposition is true, is characterized by the corresponding capital letter with the numeral or small case letter as a subscript ($K_1$, $M_w$, etc.); and the output which is at the high D.C. voltage when the proposition is false is similarly characterized except that a prime is affixed ($K_1'$, $M_w'$, etc.). The true input of the flip-flop, i.e., the one which, when energized, renders the proposition true, is characterized by the corresponding small case letter with the associated numeral or small case letter as a subscript ($k_1$, $m_w$, etc.); the false input, i.e., the one which, when energized, renders the proposition false, is characterized similarly except that a subscript zero is prefixed (${}_0k_1$, ${}_0m_w$, etc.).

Describing the circuit of flip-flop K1 of Fig. 12 in greater detail, as shown, triodes 134 and 135 are arranged such that the plate of each is intercoupled to the grid of the other by a resistor in parallel with a capacitor, such as resistor 136 and capacitor 137. Each plate is provided with a separate load resistor, such as resistor 138, prior to connection to +225 v. D.C.; each grid is provided with a separate grid resistor, such as resistor 139, prior to connection to −300 v. D.C. bias; and each cathode is grounded. The input to the grids of triodes 134 and 135 is from gating circuits 140 and 141, respectively, during, for instance, PC#347 of Fig. 15a. The gating circuit outputs are differentiated and clipped, as, for instance, by differentiating circuit 142 and diode 143 associated with the grid of triode 134, such that negative pulses only are applied to the grids. The output from each triode is from the plate and is clamped between +100 v. D.C. and +125 v. D.C. by diodes, as for example diodes 144 and 145 connected to the plate output of triode 135.

As previously pointed out, the flip-flop circuit is triggered into its opposite state by applying a negative pulse to the grid of the conducting tube. If, for instance, the term $K_1$ is to be effective, it is necessary that the plate of triode 135 be high in potential. For this condition to attain, triode 135 must be cut off. Thus it is necessary to apply a negative pulse to the grid of triode 135 by providing an output from gate 141 (i.e., all of the input signals representative of terms $M_w$, $A_1$, $O_{0-1}$, and C must be simultaneously at the high potential of +125 v. D.C.). At the end of the pulse period, the clock pulse will abruptly drop to the ineffective potential +100 v. D.C., which change in potential, after differentiation, will produce the requisite negative-going pulse. It follows that flip-flop K1 will enter period $O_2$ in a true state. It should be noted that, if flip-flop K1 were already true during $O_{0-1}$ triode 135 would already be cut off and the negative pulse supplied by gate 141 would have no effect. In this case, the only way to change the state of flip-flop K1 would be to pulse the grid of triode 134 by providing an output from gate 140.

For the presentation of other flip-flop circuits, resort will be made to block diagrams to represent the schematic form, as illustrated by Fig. 13 for flip-flop K1, and the logical equations which define when and how the flip-flop circuit is to change will be shown below the block diagram. It will be noted that, for simplicity, the program counter terms effective for the $k_1$ and ${}_0k_1$ equations used as illustrative of nomenclature have been omitted.

The action of flip-flop K1 in accordance with the equation shown will be further explained by the waveforms of Fig. 14. These graphs show how flip-flop K1 is triggered true from a prior false condition during period $O_0$. Line I represents clock signal C. Line II shows the states of O counter 118, which defines the period $O_{0-1}$ during which diode network 125 is arranged by program counter 115 to make flip-flop K1 responsive to clock signal trigger pulses which will take effect provided flip-flops M*w* and A1 are both true. In lines III and IV flip-flops M*w* and A1 are shown to be both true only at $O_0P_1$; the dashed lines of the $M_w$ and $A_1$ curves signify that the states of flip-flops M*w* and A1 at times other than during period $O_{0-1}$ are irrelevant for this example. It is thus at $O_0P_1$ only that an effective true input $k_1$ (line V) will be generated. However, flip-flop K1 will be triggered true only by a negative-going pulse applied to its true grid. This pulse occurs, as shown in line VI, when the $k_1$ input sharply drops to the low potential at the end of $O_0P_1$. The small positive-going pulse at the beginning of the last half of $O_0P_1$ has no effect on flip-flop K1 since tube (Fig. 12) is already conducting. Thus, as line VII shows, the output $K_1$ swings to a high potential at $O_0P_2$. It is noted that flip-flop K1 will remain in the true state until triggered in accordance with the ${}_0k_1$ equation of Fig. 13.

As previously stated, the computer logical operations are represented in the form of logical equations using the notation of Boolean algebra. A logical equation for the grid triggering of a flip-flop circuit consists of stating the terms which have to be of a high potential during a clock period in order that the flip-flop circuit will trigger into a particular state at the end of the clock period. Two operations are used in forming the equations. The first, "logical multiplication," means that all the terms in the particular product have to be of a high potential in order to make that product effective in a particular equation, and is accomplished in a circuit known as a logical product network (gate). The second, "logical addition," means that at least one term of the sum has to be of a high potential in order to make that sum effective in a particular equation, and is accomplished in a circuit known as a logical sum network (mixer). Logical product and sum networks will next be described by reference to Figs. 25 and 25*a* which show, for the merge routine, the complete triggering equations, block diagram, and circuitry for flip-flop K1. Thus, for example, the equation effective during PC#343:

$$k_1=(M_WH_2'+M_W'H_2)O_{8-9}C$$

is interpreted as meaning that flip-flop K1 will be triggered into the true state at the end of the clock period during which the terms $(M_WH_2'+M_W'H_2)$ and $O_{8-9}$ are at a high potential, where $(M_WH_2'+M_W'H_2)$ itself will be at a high potential whenever both the terms $M_W$ and $H_2'$, or both the terms $M_W'$ and $H_2$ are simultaneously at a high potential.

Figure 25A:
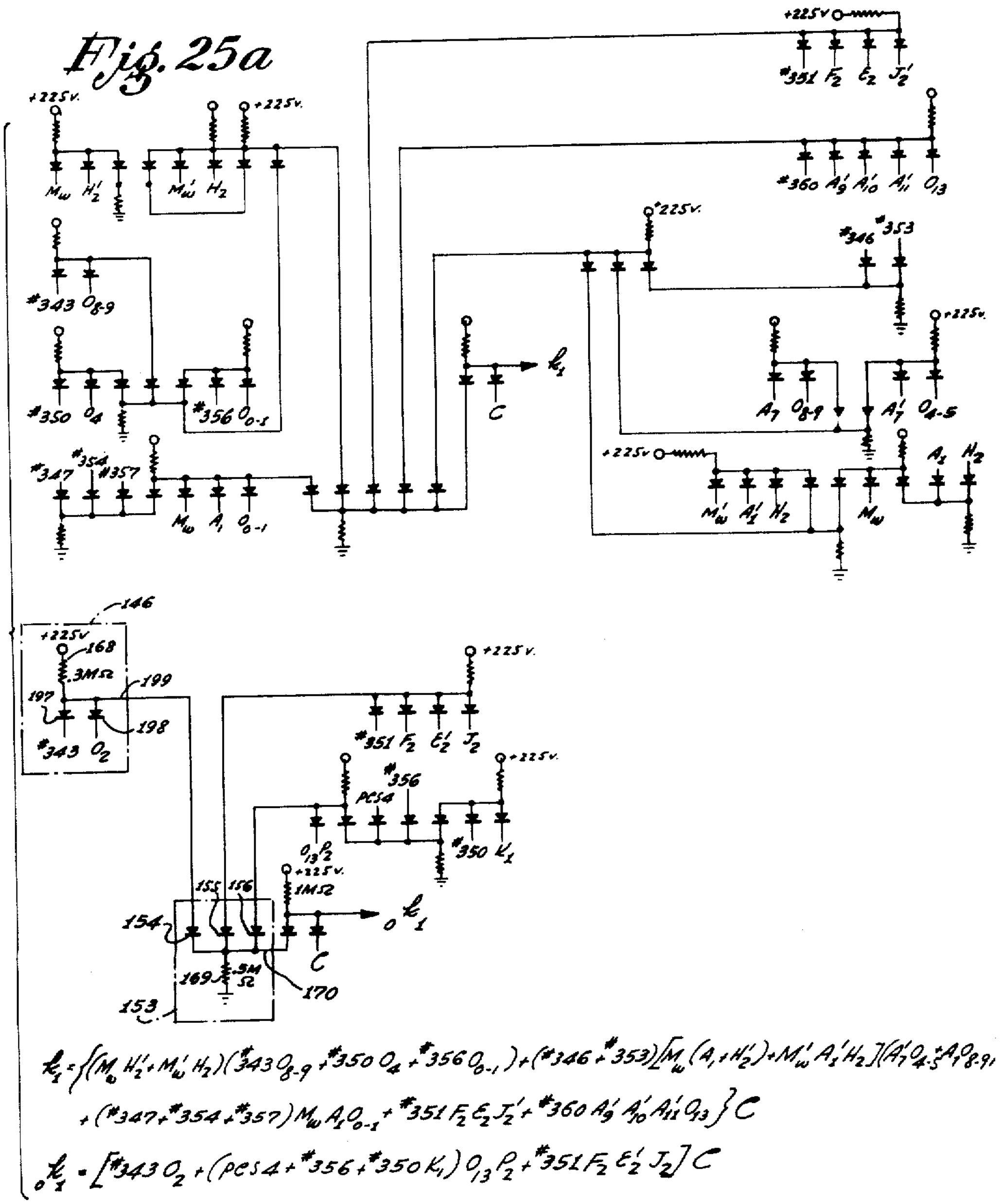
Figures 26, 31:
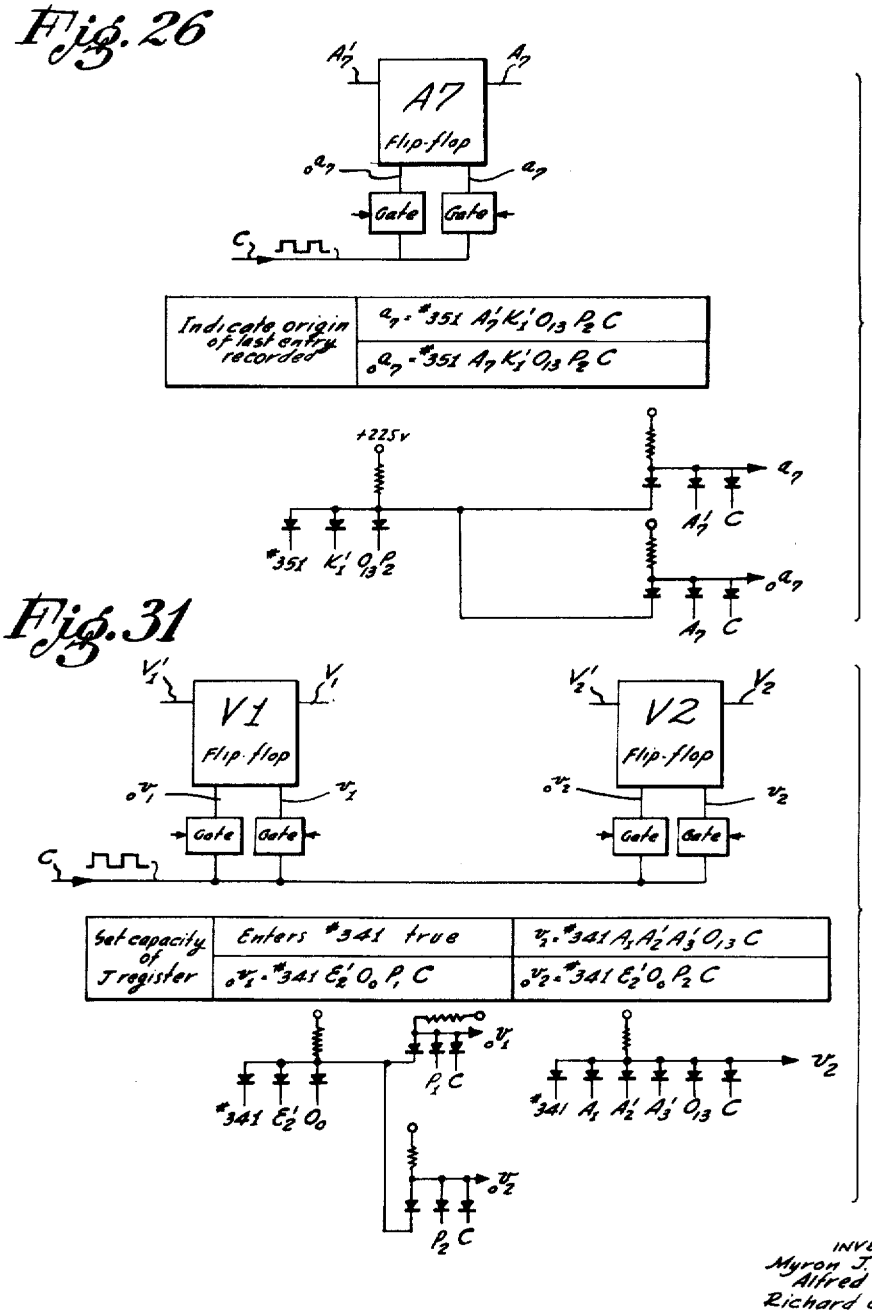
Figures 27, 29:
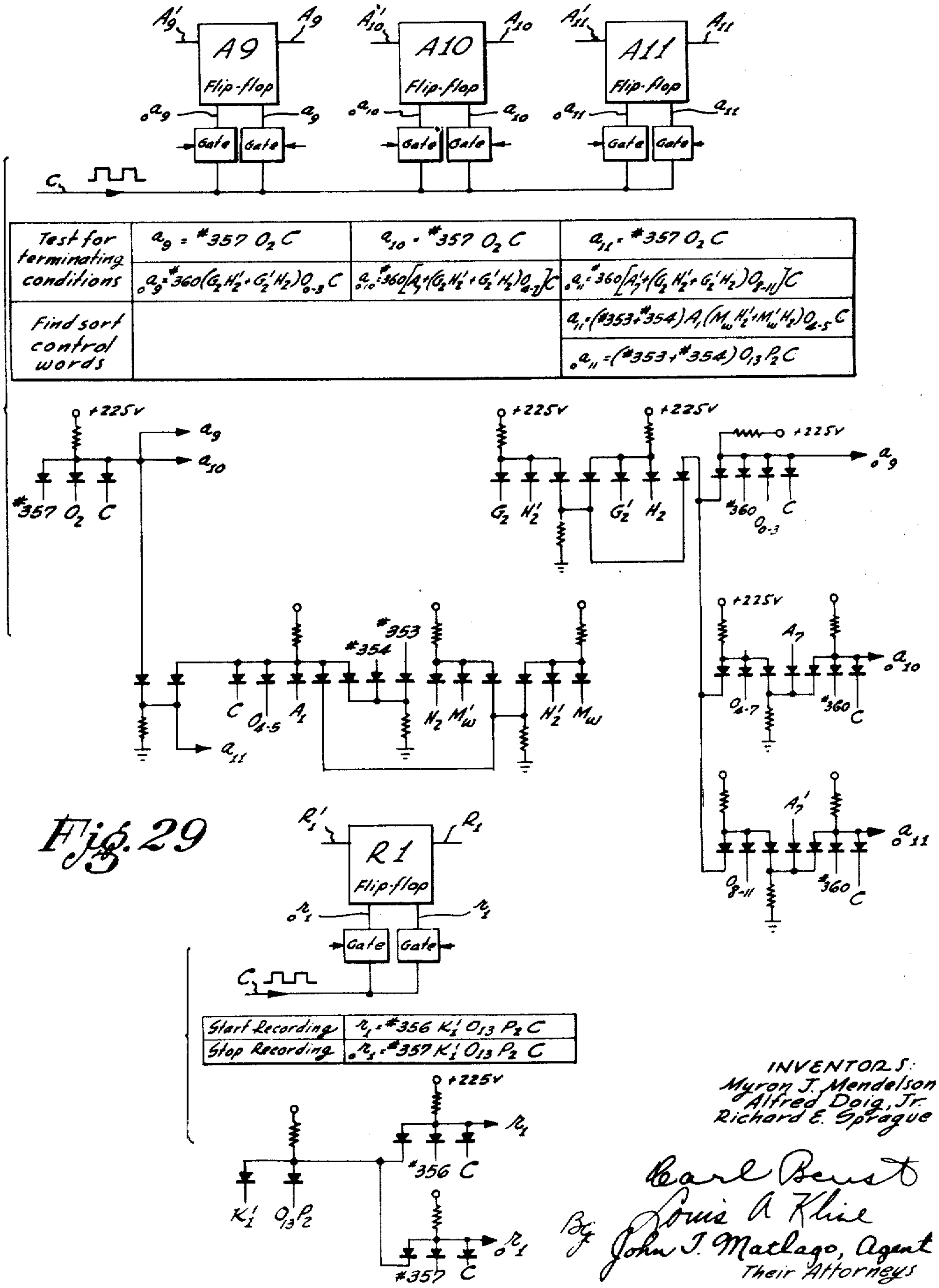
Figure 32:
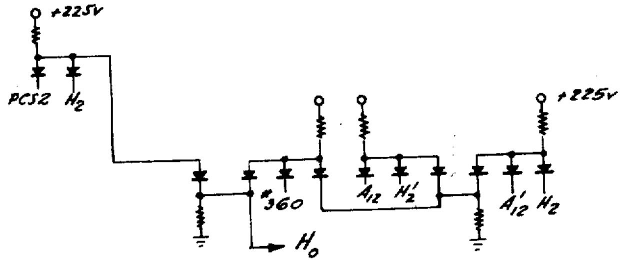
Figure 33:
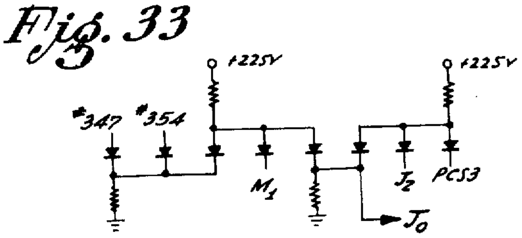
Figure 34:
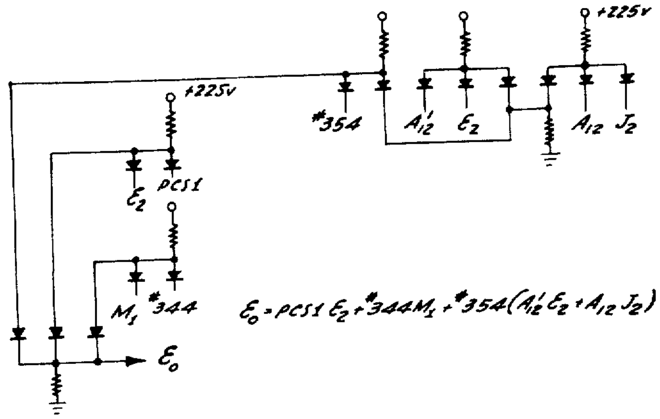
Figure 35:
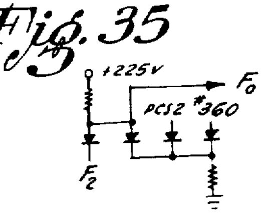
Figure 36:
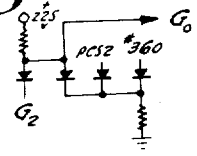

Fig. 25*a* shows the logical product networks such as 146 and logical sum networks such as 153, which are used to generate the trigger equations for flip-flop K1. The principles in accordance with which these networks are designed and operated are considered to be well known in the art, and have been well elucidated in the aforementioned reference application, Serial No. 325,144.

Briefly, the portion of the diode network enclosed within block 146 is a typical product, i.e., "and" network. In such a circuit, signals having voltage levels of either +100 or +125 are obtained from the sources indicated and applied on the cathode-ends of crystal diodes, such as 197 and 198, whose anode-ends are joined to common line 199 connected to positive source +225 v. through product resistor 168.

Any time all the diode input signals to product network 146 are at the high potential of +125 v., the output on line 199 swings to this high potential. If any one of the input signals is at the low potential of +100 v., the output on line 199 is at this low potential because of the current flow through resistor 168.

Output line 199 is connected as one of the inputs of a typical sum, i.e., "or" network, enclosed within block 153. This logical sum network is comprised of three input diodes 154, 155, and 156 whose cathode-ends are joined to common line 170 and returned to ground through sum resistor 169. The input signals to this circuit are applied on the anode-ends of the diodes. Whenever any one of the inputs to logical sum network 153 is at the high potential of +125 v., the current flow through sum resistor 169 causes output line 170 to swing to the high potential +125 v.

It is also evident that output line 170 is connected as an input to a further logical product network, and the output of the latter is the term ${}_0k_1$, which, as mentioned, drives the false input of flip-flop K1.

More particular reference will next be made to Fig. 15*a* showing an extract of the computer flow diagram relevant to the merge routine of the present invention. This figure shows how the step operations rendered effective by program counter 115 are arranged to merge two groups of sorted entries each located in a separate memory channel of the computer to form a single group of sorted entries located in a separate memory channel of the computer. As Figs. 15*b* to 15*e* indicate, within the rectangle representing each word time block, concise statements appear defining the activity during that word period. Below each of the blocks, logical equations are presented which define how the statements made within the rectangle are precisely stated in terms of the computer. It should be pointed out that not all of the propositions previously noted in connection with Fig. 8 as being generated by arithmetic diode network 125 are needed in order to accomplish the operations performed during a word period. Thus equations are listed below each word block for only those propositions which are effective during the word periods of a block. In the subsequent description, it may be considered that if one of the propositions shown feeding out of the right of diode network 125 of Fig. 8 is not generated during a word period, it is equal to zero, i.e., ineffective, for that word period.

It will be seen that certain operations and, therefore, certain forms of the logical equations occur in more than one word time block. As described, the scheme of the present invention provides circuitry for physically generating logical products and logical sums. Thus, by mere reference to an equation, the arrangement of the circuitry for generating the equation can be set up directly. However, it is not necessary for a logical combination of terms to be generated more than once. Thus, when a particular equation is used in several word time blocks, it is only necessary to provide circuitry for generating this equation once, and then to logically multiply the output with the PC#s which define when it is to be operative. The simplification of the equations and, therefore, diode networks by this means results in a reduction of the number of terms and components required. Thus, it is seen that the equation $F_0=F_2$ occurs for every PC# block in Figs. 15*b* to 15*e*. The PC#s for various of these blocks are logically summed by the diode networks shown in Fig. 28, generated as a separate function and designated simply as PCS2 (program counter sum 2). These PCS functions are employed as inputs to the logical gates or mixers represented by the appropriate equations.

In the discussion of Figs. 15*b* to 15*e* that follows, this simplification will become evident if reference is made, where desired, to Figs. 23 through 36, which show all diode networks, block diagrams, and logical equations for generating the logical propositions referred to in connection with Figs. 15*b* to 15*e*.

As previously discussed, in accounting operations, groups of items of information, each item comprising data referring to a specific business transaction, are often required to be sorted in accordance with one datum in the items. The first step involved in the overall sorting process is to sort the entries in each channel in accordance with a previously conducted sort routine such as shown and described in a co-pending application entitled "Computer Sorting System," Mendelson et al., Serial No. 487,172, filed January 27, 1955 and now abandoned. The next step involved in the overall sorting process is the merge routine of the present invention which generally provides for merging the already sorted groups of entries in each of two channels to form a third sorted group of entries to be stored in a third channel or, if required, a plurality of channels.

In addition to assuming that the group of entries in each of two channels has already been sorted, the present operation further assumes that the recirculating registers of the arithmetic unit are already storing initial operating data obtained from previous recordings placed in predetermined registers of the memory by the operator. This initial data primarily presents a means for controlling the circuitry of the arithmetic unit so that it will properly operate on the "entries" to be merged in the memory. The merge command, as shown in Fig. 16, programs the computer to properly set up this initial information in the recirulating registers. For example, the computer is capable of operating on entries of various lengths. Thus the present operation assumes that the arc of the memory specified by the $m_1$ portion of the merge command has been looked up and the entry length code, as specified therein, has been already transferred to the E register for recirculation. The present operation also assumes that the arc of the memory identified by the $m_2$ portion of the command has been looked up and the sorting digit identifying code, as specified therein, has been already transferred to the F register for recirculation. In addition, the present merge routine requires that the addresses of the sort control words of the initial and terminal "entries" of the groups to be merged, together with the initial recording address in the third channel, shall be specified. It is also preferable that the terminal recording address in which the merged "entries" are to be recorded shall be specified. Thus the present operation assumes that the arc of the memory specified by the $m_3$ portion of the command has been looked up and the three terminal addresses therein have been already transferred into the G register for recirculation. This last look-up and transfer furthermore causes the computer to automatically look up information in the arc programmed to contain the initial merging addresses and to transfer the three initial addresses therein into the H register for recirculation.

Additionally, it is to be noted that, upon entering PC#341, all flip-flops, with the exception of flip-flops V1 and V2, are false.

In summary, the present operation assumes the merge command has been detected and other routines have been already carried out to arrange the recirculating registers to correspond with the merging problem. Thus, recirculating in the first two octal digit periods of the E register are binary digits corresponding to the code (Fig. 11) for the entry length; Fig. 17 is illustrative for an entry length of 4 words. Recirculating in the F register, as shown in Fig. 18, are binary digit ones in binary digit positions corresponding to the positions of the sorting digits in the sort control words of the entries. These sorting digits are used to compare "entries" during the merge routine.

For illustrative purposes, it will be assumed that a group of sorted entries located in channel 10 of the memory are to be merged with a group of sorted entries located in channel 12 of the memory. Thus, recirculating in the G register, as shown in Fig. 19, are the terminal addresses as already defined: the $m_1$ portion of the G register thus contains the address of the last sort control word of the entries in channel 10; the $m_2$ portion contains the address of the last sort control word of the entries in channel 12; and the $m_3$ portion contains the address of the arc of the memory in which it is planned to store the first word of the last entry to be merged with this command. Recirculating in the H register, as shown in Fig. 20, are the initial addresses also already defined: the $m_1$ portion of this register contains the address of the first sort control word of channel 10; the $m_2$ portion contains the address of the first sort control word of channel 12; and the $m_3$ portion contains the address of the arc of the memory in which it is planned to store the first word of the entry, the magnitude of whose sorting digits is shown by the merging criteria of the preferred system of the invention to be the smallest.

Briefly, the operation performed by the flow chart of Fig. 15*a* is as follows: the entry length code in the E register is used to set up the J buffer register head selecting circuit so that the word capacity of the J buffer register is established to correspond to the entry length. The first sort control word of channel 10, as addressed in $m_1$ of the H register, is then read from the memory into the E register, thereby replacing the entry length code, which has in the meantime been transferred to a flip-flop storage (A1 to A6). Using the address in $m_2$ of the H register, which, as noted, specifies the location of the first sort control word of channel 12, the invention provides means to look up the first word of the first entry of channel 12 and to transfer this entire entry to the J buffer register. During the word period in which the sort control word of the J buffer register is passed through arithmetic unit 114, a comparison is made of the two sort control words to determine the relative magnitude of the sorting digits thereof.

If the sorting digits of the J buffer register sort control word are the smaller, the entry in the J buffer register is read into consecutive memory arcs commencing with the arc addressed in $m_3$ of the H register.

If the sorting digits of the E register are the smaller, the sort control word of the entry in the J buffer register is transferred to the E register and the entry corresponding to the sort control word previously in the E register (address in H register) is transferred to the J buffer register. The entry now in the J buffer register is read into consecutive memory arcs commencing with the arc addressed in $m_3$ of the H register.

If the sorting digits of the J buffer register sort control word and of the E register are equal, the entry corresponding to the sort control word originally from channel 10 is selected to be recorded into the memory for this merge; recording is direct if it is already in the J buffer register, or after transferring it to the J buffer register from the memory (using address in H register) if its sort control word is in the E register. The entry corresponding to the sort control word originally from channel 12 will be recorded into the memory as a result of the comparison immediately following if its sorting digits are smaller than those of the next entry picked up from channel 10.

The addresses in $m_3$ and $m_1$ or $m_2$ of the H register, the choice between $m_1$ and $m_2$ depending on whether a channel 10 or channel 12 entry, respectively, has just been recorded into the memory, are each increased by one entry length and a test is made to determine whether or not this merge shall terminate by comparing the present addresses of the H register with the terminal addresses in the G register. If the test is positive, the computer sequences to a rest condition, PC#0, to await further instructions; if the test is negative, the J buffer register if filled with the second entry of channel 10 if the first entry of channel 10 had been put away, or with the second entry of channel 12 if the first entry of channel 12 had been put away.

The merge routine, commencing with the comparison of the sorting digits of the sort control words, is again conducted and repeated until the test for termination is positive. At this time, the routine is automatically halted and the computer sequences to the rest condition.

Figure 15B:
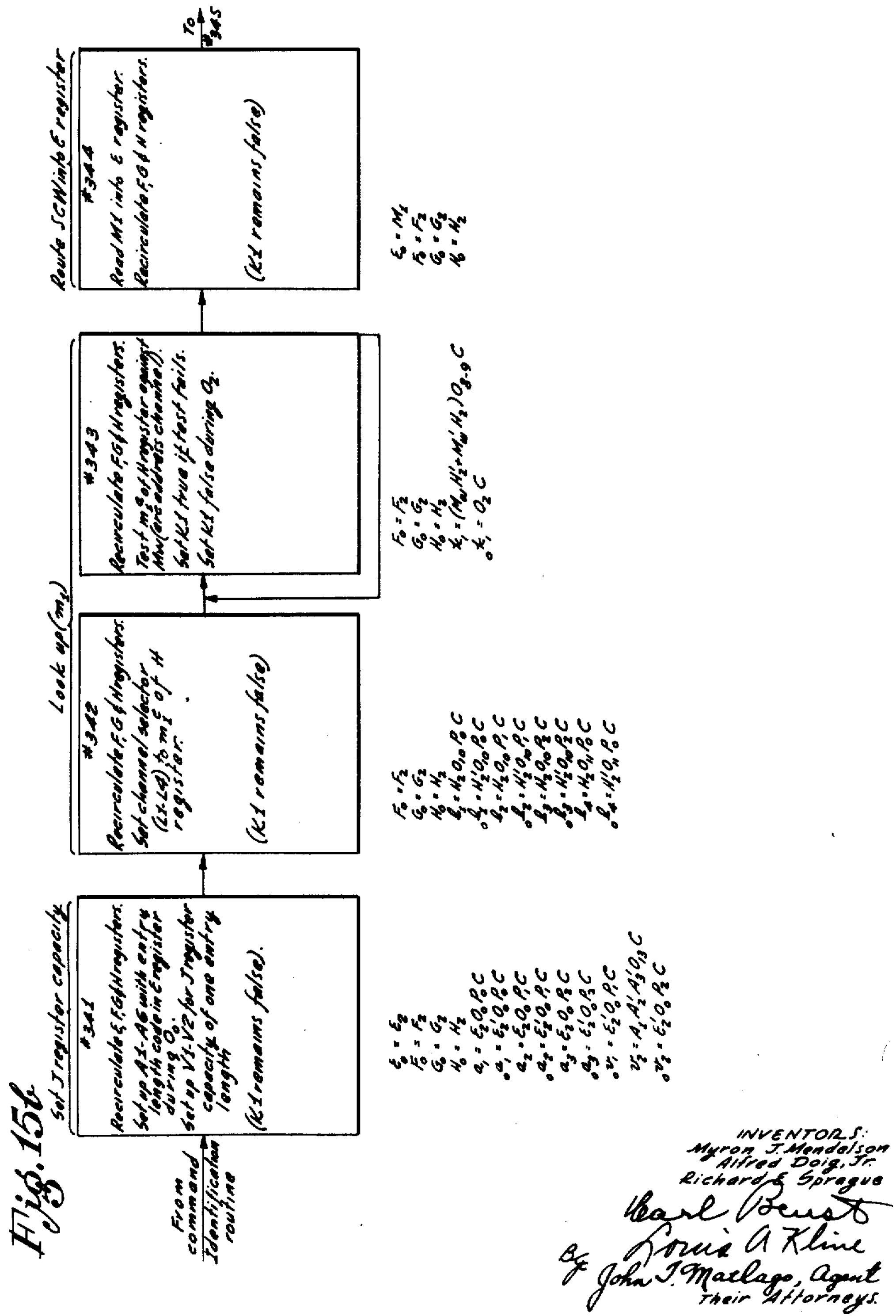

Referring to PC#341 of Fig. 15*b* more particularly, the first statement made is that the E, F, G, and H registers are recirculated. This is represented by the equations $E_0=E_2$, $F_0=F_2$, $G_0=G_2$, and $H_0=H_2$, as discussed in connection with Fig. 8. Thus the entry length code in the E register, the sorting digit identifying code in the F register, the terminal addresses in the G register, and the initial addresses in the H register are made available.

It is to be noted that very frequently throughout the merging routine, various of the recirculating registers are recirculated normally such that the content thereof is not disturbed. For purposes of expediting the discussion of Figs. 15*b* to 15*e* which follows, the omission of reference to these registers for this function will be considered justified.

Since it is the primary function of PC#341 to set the word capacity of the J buffer register, it is next indicated that flip-flops A1 to A6 are set up with the entry length code. As mentioned, these flip-flops are false when entering PC#341; thus it is necessary that only the grids of flip-flops A1 to A3 be triggered in accordance with the period $O_0$ content of the E register, as the respective equations show. Reference to Fig. 11 will clarify the arrangement in the E register and in flip-flops A1 to A6 for each of the entry lengths contemplated by the preferred computer design.

The following statement in PC#341 is that flip-flops V1 and V2, which enter in a true state, are set to provide the J buffer register with a word capacity corresponding to the entry length. These flip-flops, it will be recalled, control connections in gating circuits 116 between the four read heads of the J buffer register and arithmetic unit 114. More specifically, as illustrated in Figs. 9 and 11, for the particular entry length of four words, for example, flip-flop V1 remains true (the equation $$_0v_1=E_2'O_0P_1C$$

is not effective) and flip-flop V2 is triggered false by the equation $_0v_2=E_2'O_0P_2C$ (the equation $$v_2=A_1A_2'A_3'O_{13}C$$

is also not effective).

The last statement of PC#341 stipulates that flip-flop K1 remains false. As previously noted, the function of flip-flop K1 is to signal program counter 115 to count to the next count or skip to a different count. It should be understood that the choice as to how program counter 115 should change its derived as a result of information either received or generated during each word period and set up in flip-flop K1. In the present instance, flip-flop K1 was false at the end of the word block immediately preceding PC#341 (not shown). Flip-flop K1, during PC#341, will remain false and, at the end of the word period, the computer will count out of PC#341 and enter PC#342. It is emphasized that, for a word period, it is the status of flip-flop K1 at pulse position $O_{13}P_2$ which determines how program counter 115 should change at the end of a word period and that a triggering of flip-flop K1 at $O_{13}P_2$ does not affect this decision since such triggering takes effect at the beginning of the next word period.

During PC#s 342, 343, and 344, the channel 10 sort control word (SCW) addressed in portion $m_1$ of the H register is looked up and routed from the memory into the E register.

In PC#342, flip-flops L1 to L4 are set up to select channel 10 of the sixteen memory channels in the present computer. The grid triggering equations shown for these flip-flops indicate that they are arranged to accord with the content of the H register during the period $O_{10}P_0$ to $O_{11}P_0$, thereby causing an output signal on line 120 (Fig. 8) of diode network 125 to actuate gating circuits **167*a* so as to operatively connect flip-flop M1 to follow the head of channel 10. Referring to Fig. 7, a table shows the contents of flip-flops L1 to L4 which define the outputs for each of the memory chanels 111**, while Fig. 6 shows a diode matrix which reduces these outputs to physical circuitry.

Thus note that the output *Ch*1 in Fig. 6 is connected to line 121 to which flip-flop outputs $L_1$, $L_2'$, $L_3'$, and $L_4'$ are connected by diodes, such as diode 122. A +225 v. source is also connected to line 121 through resistor 124. The operation of this circuit is such that only when all of the above specified flip-flop outputs are at the high potential of +125 v. that the output *Ch*1 is at substantially the same high potential. Simultaneously, the outputs corresponding to the other memory channels will be at the low potential of +100 v.

Flip-flop K1 remains false during PC#342; thus program counter 115 counts to PC#343 at the end of this period.

During the operation of PC#343, the $m_1^a$ portion of the H register (as it steps in flip-flop H2) is tested against arc address channel 109 and flip-flop K1 is set true each time the test fails. This test operation is logically noted by the equation $$k_1=(M_wH_2'+M_w'H_2)O_{8-9}C$$

Thus, by comparing the output of flip-flop H2 during the period $O_{8-9}$, which defines the location of an $m_1^a$ address in a word period (Fig. 2), the state of flip-flop K1 during $O_{13}P_2$ of each word period will indicate the result of the test. Note that the above equation states that flip-flop K1 is set true whenever the comparison fails, resulting in the computer repeating the operation in PC#343. The equation $_0k_1=O_2C$ is provided to cause flip-flop K1 to be false prior to making the test. Thus, at the end of the word period during which the proper arc is read, as indicated by the equation $$k_1=(M_wH_2'+M_w'H_2)O_{8-9}C$$

not being satisfied, flip-flop K1 remains false. Therefore, program counter 115 counts and advances the routine to PC#344.

PC#344 operates to route the sort control word of channel 10, addressed in $m_1$ of the H register and previously located by PC#s 342 and 343, into the E register. The digits of this word are sensed by the head corresponding to channel 10, as activated by flip-flops L1 to L4, and the output of this head triggers flip-flop M1. Diode network 125 is arranged by program counter 115 to read the output of flip-flop M1 into the E register by the equation $E_0=M_1$. It is noted that this process does not affect the content of the storage register in the memory occupied by this sort control word; the digits of the E register are simply arranged to corespond to this content.

Again flip-flop K1 remains false, thereby causing a count to PC#345.

Figure 15C:
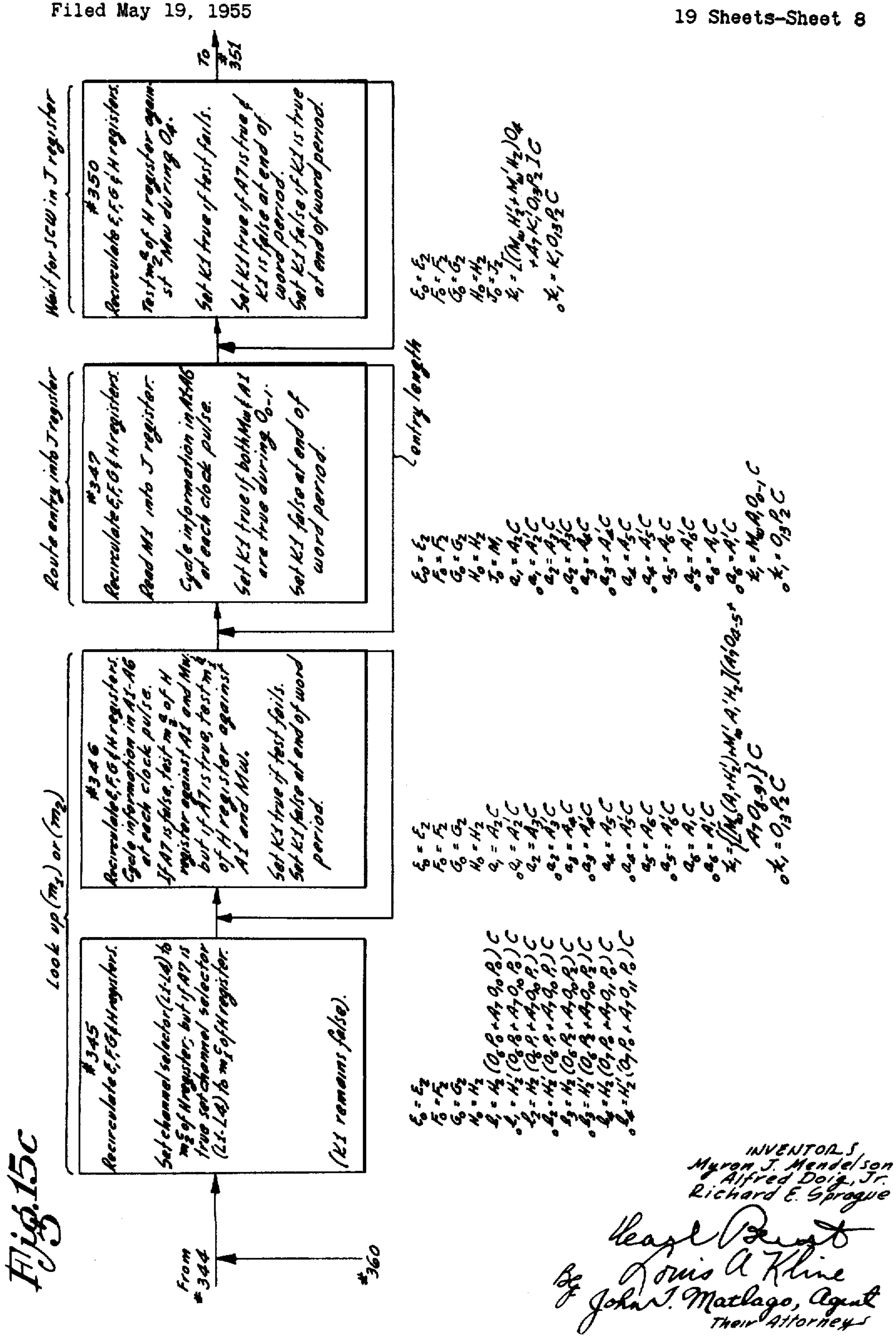
Figure 15D:
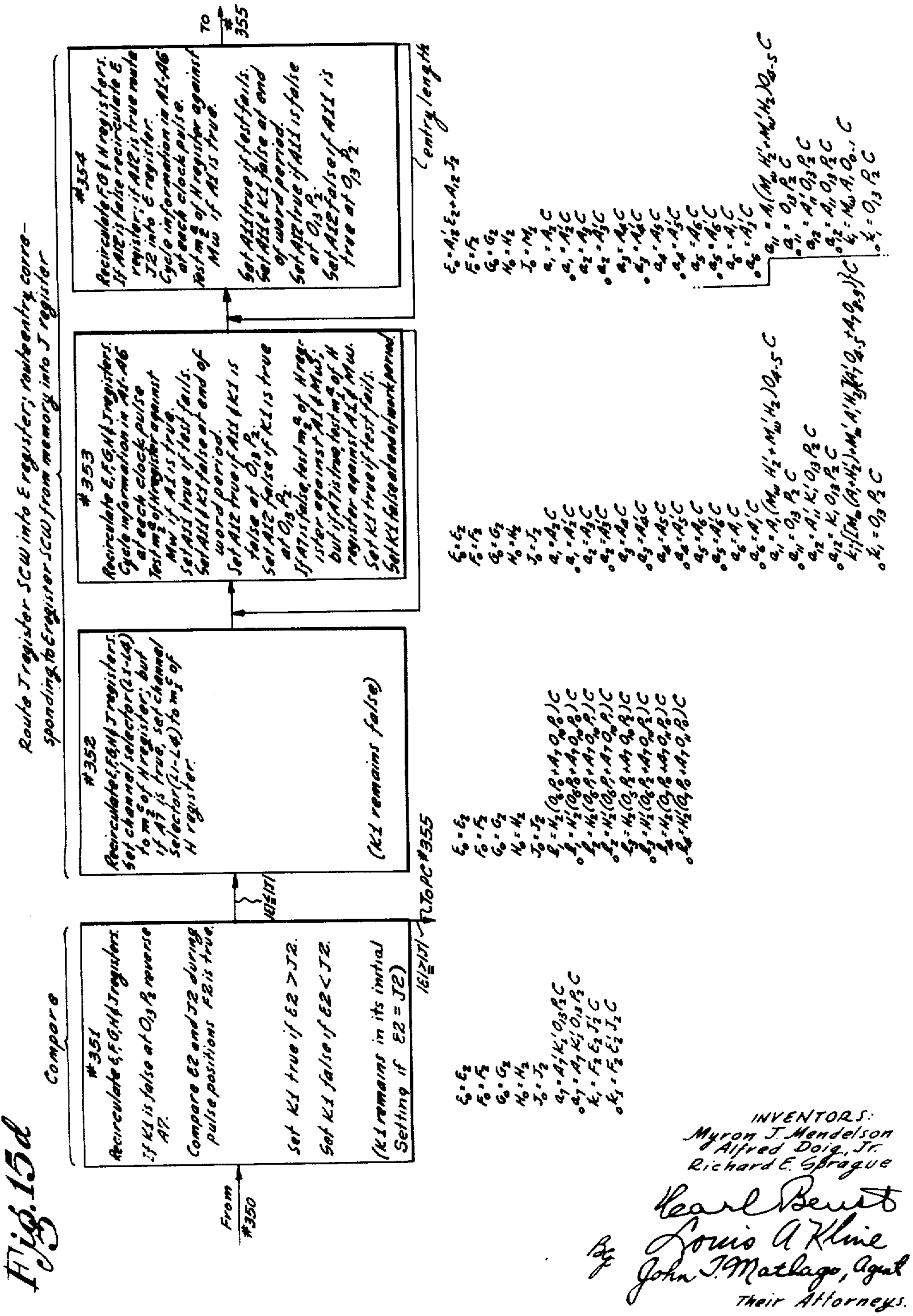
Figure 15E:
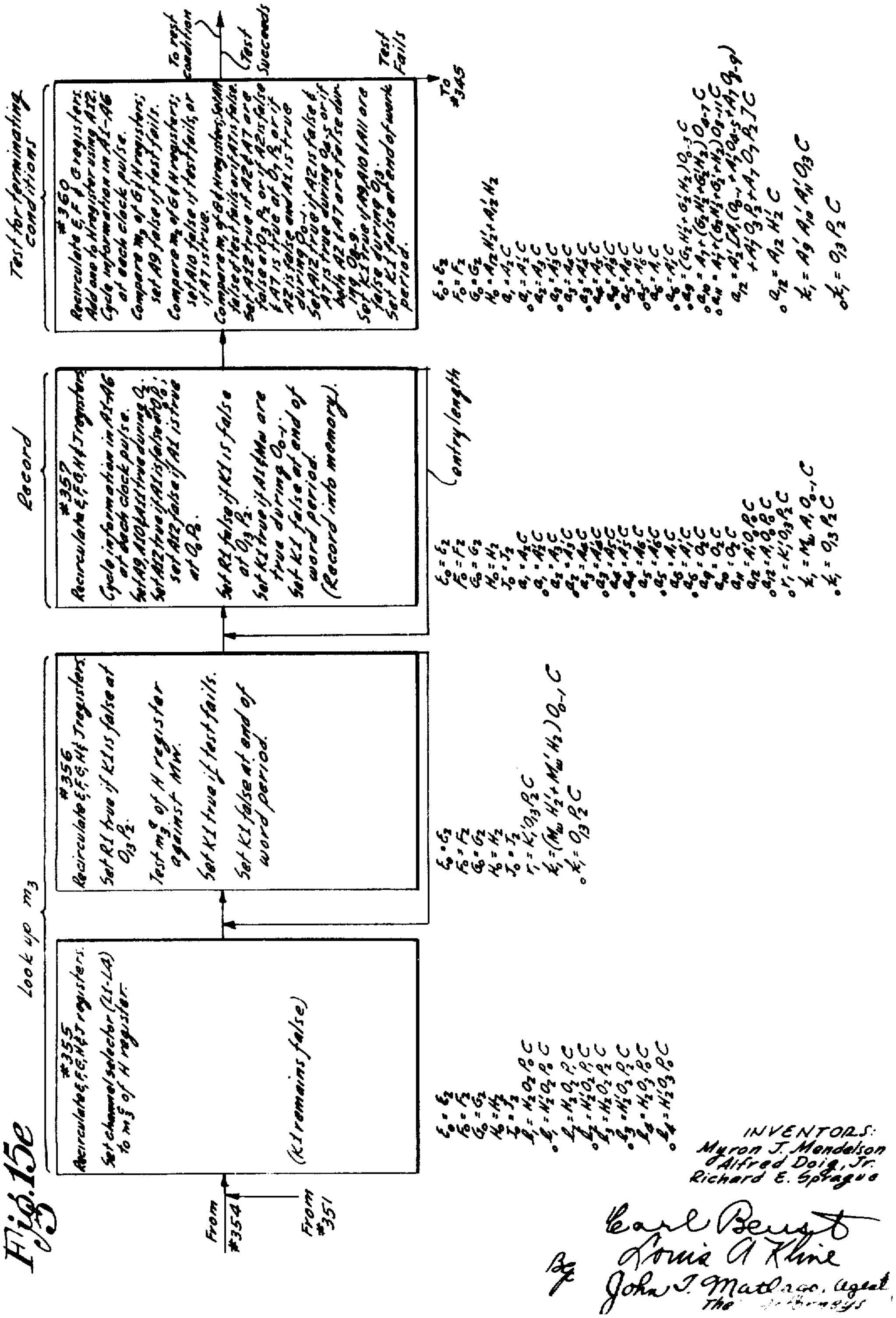

It is seen from Fig. 15*c* that entrance into PC#345 may be made by a count from PC#344 or by a skip back from PC#360. It is next desired to insert an entry into the J buffer register; this entry is to be from channel 12 if a sort control word (SCW) from channel 10 is recirculating in the E register, but it is to be from channel 10 if a SCW from channel 12 is recirculating in the E register. It should be obvious that, if entrance into PC#345 is from PC#344, a SCW from channel 10 is in the E register and an entry from channel 12 is to be inserted into the J buffer register. It follows that the next look-up operation, occurring in PC#s 345 and 346, will find the address specified in $m_2$ of the H register. However, if entrance into the PC#345 is from PC#360, it is an indication that an entry has been recorded back into the memory and this entry may have originated in either channel 10 or channel 12. As will be subsequently described, it is the function of flip-flop A7 to indicate the group of which the last entry so recorded is a part. If flip-flop A7 is false during PC#345, the recorded entry is from channel 12 and the next entry to be routed into the J buffer register is the next channel 12 entry; thus the address specified in $m_2$ of the H register is to be located. If flip-flop A7 is true during PC#345, the recorded entry is from channel 10 and the next entry to be routed into the J buffer register is the next channel 10 entry; thus the address specified in $m_1$ of the H register is to be located.

These considerations are effective in the channel look-up equations for triggering the grids of flip-flops L1 to L4 in PC#345. The equations $$l_1=H_2(O_6P_0+A_7O_{10}P_0)C\ \ldots\ _0l_4=H_2'(O_7P_0+A_7O_{11}P_0)C$$

indicate that flip-flops L1 to L4 will be set as directed by flip-flop H2 (which reflects the H register content) during the period $O_6P_0$ to $O_7P_0$ (corresponding to $m_2$ of the H register); but if flip-flop A7 is true, this setting may be changed to one directed by flip-flop H2 during the period $O_{10}P_0$ to $O_{11}P_0$ (corresponding to $m_1$ of the H register).

In summary, where PC#345 has been preceded by PC#360, is is presumed that the last entry recorded was a channel 12 entry and a look-up for the next entry in channel 12 will be made. However, if flip-flop A7 indicates that the last entry recorded was a channel 10 entry, a look-up for the next entry of channel 10 will be made.

Referring next to PC#346, it has been pointed out that flip-flops A1—A6 operate as a cyclical shift register in which, on successive clock pulses, the content (the code for the entry length) is shifted from flip-flop A6 to flip-flop A5, etc. In other words, the content of a flip-flop in the register is made to correspond to that of the preceding flip-flop for the preceding pulse position: flip-flop A5 "follows" flip-flop A6, flip-flop A4 "follows" flip-flop A5, etc., and flip-flop A6 "follows" flip-flop A1. It is thus noted that during a word period, the code in flip-flops A1 to A6 passes through flip-flop A1 each two octal periods.

It will be recalled that the look-up technique employed by the computer presumes that the desired memory arc will be the next to be sensed in arithmetic unit 114 and thus program counter control flip-flop K1 is set false at the end of a word period ($_0k_1=O_{13}P_2C$); but if the presumption fails, as indicated by a test made each word period, flip-flop K1 is set true and remains true for pulse position $O_{13}P_2$. This test uses the output of arc address channel 109, appearing in flip-flop M*w*, to compare with the address of the desired arc set up in the H register, and appearing in flip-flop H2. However, in the instant case, it is desired to locate the arc of the first word of the entry whose sort control word is addressed in either $m_1$ or $m_2$ of the H register, since the entire entry must be transferred from the memory to the J buffer register. In other words, a program counter count must be made when the next word of the memory channel previously selected to be sensed by arithmetic unit 114 is the first word of an entry, regardless of entry length. Thus flip-flop K1 will remain false only for the word period when the arc address passing through flip-flop M*w*, for either period $O_{4-5}$ or $O_{8-9}$, is equal to the number in the H register decreased by a number equivalent to the position of the sort control word in the entry.

It is noted that the preferred embodiment of the present invention provides for eight-word entries being stored in a channel commencing in arcs whose addresses, as defined by the arc address channel (Fig. 5), end in binary 000, four-word entries are stored commencing in arcs whose addresses end in binary 00, and two-word entries are stored commencing in arcs whose addresses end in binary 0. Therefore, the arc of the first word of an entry will be passing through arithmetic unit 114 when the address of the sort control word of this entry (as set up in the H register) tested against arc addresses (passing through flip-flop M*w*) fails to set flip-flop K1 true, provided that the final binary digits of the sort control word addresses be modified to contain 000 for the case of eight-word entries, 00 for the case of four-word entries, and 0 for the case of two-word entries. This modification is accomplished in accordance with the equation:

$$k_1=[M_w(A_1+H_2')+M_w'A_1'H_2](A_7'O_{4-5}+A_7O_{8-9})C$$

by flip-flop A1, which will be true when these final binary digits are sensed. More particularly, the term $M_wA_1$ will be true during a clock period if both flip-flops $M_w$ and A1 are simultaneously true and thus set flip-flop K1 true regardless of the state of flip-flop H2. Subsequent to the binary digit position when flip-flop A1 is set false (as directed by the particular entry length code involved), the term $M_w(A_1+H_2')+M_w'A_1'H_2$ will reduce, by use of well-known laws governing Boolean algebra, to $(M_wH_2'+M_w'H_2)$ which, it has been shown, performs arc selection.

It is further noted that the false state of the A7 flip-flop enables the above test to be performed for the $m_2$ address of the H register, and the true state of the A7 flip-flop enables the above test to be performed for the $m_1$ address of the H register. For example, considering the case of two-word entries and flip-flop A7 in the false state, it is noted from Figs. 11 and 20 that flip-flop A1 will be true at $O_4P_0$ and false during the period $O_4P_1$ to $O_5P_2$. Thus, suppose that the sort control word is the first word of the entry and that at $O_4P_0$ of the word period that the address of this word as specified, in the H register, is in arithmetic unit 114 the digit of the arc address passing through flip-flop M*w* is a 1. For these conditions, the $M_wA_1$ term of the above equation will be effective to trigger flip-flop K1 true, and it will remain true for the remainder of the word period, thus causing the program counter to stick in PC#346. During the next word period, however, at $O_4P_0$, flip-flop M*w* will be false and thus the first term of the equation will not be effective; also, flip-flop A1 will be true and thus the second term $M_w'A_1'H_2$, of the equation will not be effective. Additionally, for the period $O_4P_1$ to $O_5P_0$, flip-flops M*w* and H2 will be either both true or both false; and thus neither the first nor second terms of the equation will be true. Thus flip-flip K1 will remain false during the entire word period, causing the program counter 115 to advance to PC#347. The same reasoning applies if the sort control word is the second word of the two-word entry or in the case of any other entry length regardless of the position in the entry occupied by the sort control word. The computer thus leaves PC#346 and enters PC#347 when the first word of the entry is about to be sensed by arithmetic unit 114.

The operations of PC#347 are conducted a number of times corresponding to the entry length, i.e., once for a one-word entry length, twice for a two-word entry length, etc. During each word period of PC#347, a word of the entry on the memory located by the operation of PC#346 is routed into the J buffer register by a network arrangement represented by the equation $J_0=M_1$. To limit this process to a number of word periods corresponding to the entry length, the entry length code is "recirculated" in flip-flops A1 to A6 as before and flip-flop K1 is triggered true, for program counter sticking, each word period that flip-flops M*w* and A1 are both true at a pulse position during the first two octal periods: $k_1=M_wA_1O_{0-1}C$. The reasoning presented during the discussion of PC#346 will indicate that only during the last word of an entry, will flip-flop K1 fail to be triggered true. The resultant false state of flip-flop K1 at $O_{13}P_2$ will thereby cause a count to PC#350.

The equations for triggering flip-flop K1 in PC#350 accomplish two functions. Firstly, it is now apparent that the term $(M_wH_2'+M_w'H_2)O_4$ of the $k_1$ equation, in conjunction with the equation $_0k_1=K_1O_{13}P_2C$, permits sequencing to PC#351 when the sort control word in the J buffer register is about to enter arithmetic unit 114. Secondly, the term $A_7K_1'O_{13}P_2$ indicates that flip-flop K1 will be caused to enter PC#351 in the true state if flip-flop A7 is true at $O_{13}P_2$. It will be shown in connection with PC#351 that flip-flop A7 indicates by a true state that the last entry recorded back into the memory originated in channel 10 and by a false state that the last entry originated in channel 12. It follows that, on entering PC#350, if flip-flop A7 is true, the J buffer register contains a channel 10 entry; but if flip-flop A7 is false, the J buffer register contains a channel 12 entry. In the event that the sort control words to be compared in PC#351 are found to have sorting digits of equal magnitude, it is desired to record the channel 10 entry prior to the channel 12 entry. The reason for arranging the logic of the invention in this manner is to preserve any lower order sort already established in the data by prior sorting and merging routines, especially where sorting digits are contained in more than one word of an entry. Since, in PC#351, flip-flop K1 will be employed to indicate the result of the sorting digit comparison and the state of flip-flop A7 will be shown to depend on that of flip-flop K1, to assure that flip-flop A7 will indicate properly which channel (channel 10 or channel 12) has last had an entry recorded into the memory, on entering PC#351, flip-flop K1 is initially set to correspond to the state of flip-flop A7 in PC#350.

It is in PC#351 that sorting digit comparisons are made. During the word period, if the sorting digits of the sort control word in the E register exceed in magnitude those of the sort control word in the J buffer register, flip-flop K1 is set true: $k_1=F_2E_2J_2'C$; but if the sorting digits of the sort control word in the J buffer register exceed in magnitude those of the E register, flip-flop K1 is set false: ${}_0k_1=F_2E_2'J_2C$; however, if both groups of sorting digits are equal, flip-flop K1 is not affected. Thus, if $/E/</J/$, flip-flop K1 is false and a count to PC#352 is made; if $/E/>/J/$, flip-flop K1 is true and a skip to PC#355 is made. Furthermore, if $/E/=/J/$ and flip-flop A7 is false (i.e., a channel 10 sort control word is in the E register), flip-flop K1 will remain false; but if $/E/=/J/$ and flip-flop A7 is true (i.e., a channel 12 sort control word is in the E register), flip-flop K1 will be triggered true. For reasons already expressed, flip-flop A7 is triggered to the opposite state if flip-flop K1 is false (a count is made) at the end of the word period: $a_7=A_7'K_1'O_{13}P_2C$, ${}_0a_7=K_1'O_{13}P_2C$.

It will first be assumed that the condition $/E/>/J/$ or the condition $/E/=/J/$ (flip-flop A7 is true) has been found in PC#351, and a program counter skip is made to PC#355.

On entering PC#355, it is known that the entry recirculating in the J buffer register is to be recorded into the memory. As already pointed out, the addresses into which the recording is to be made are sequential, commencing with the address specified in portion $m_3$ of the H register.

As a consequence, in accordance with techniques already described, during PC#s 355 and 356, the address in $m_3$ of the H register is looked up. Additionally, the equation $r_1=K_1'O_{13}P_2C$ sets flip-flop R1 true at the end of the last word period of PC#356, i.e., at the end of the word period in which flip-flop K1 is false at $O_{13}P_2$. As mentioned in connection with Fig. 8, flip-flop R1, when true, permits record propositions $R_0$ and $R_0'$ to be recorded into the memory. This technique utilizes flip-flop R1 as a gating means for these propositions. The gate is opened by setting flip-flop R1 true since the next block, PC#357, is that in which recording is done.

The primary function of PC#357 is to route the entry in the J buffer register into the memory. Thus the operations of PC#357 are performed a number of times corresponding to the entry length. For this purpose, as in PC#347, the control employed is the recirculation of the entry length code in flip-flops A1 to A6, making flip-flop K1 true in response to true states of flip-flops M*w* and A1: $k_1=M_wA_1O_{0-1}C$, and setting flip-flop K1 false at the end of each word period: ${}_0k_1=O_{13}P_2C$.

Flip-flops A9, A10, and A11 are set true by the equations $a_9=O_2C$, $a_{10}=O_2C$, and $a_{11}=O_2C$ for use in PC#360.

Recording flip-flop R1 is triggered false at the end of the last word period of PC#357: ${}_0r_1=K_1'O_{13}P_2C$.

As will be shown, flip-flop A12 during PC#360 operates as a control for the addition of a unit to each of two of the addresses recirculating in the H register; an addition will be made only if flip-flop A12 is true. In PC#357, by means of the equations $a_{12}=A_1'O_0P_0C$ and ${}_0a_{12}=A_1O_0P_0C$, flip-flop A12 is set as directed by flip-flop A1 at $O_0P_0$. Reference to the coding in Fig. 11 will indicate that only for an entry length of one word (for which case all words are sort control words) is flip-flop A1 false at $O_0P_0$. Accordingly, for this case only, the above $a_{12}$ equation detects the false state of flip-flop A1 at $O_0P_0$ and sets flip-flop A12 true to cause an addition to the addresses in the H register.

Basically, PC#360 performs a dual function. One purpose is to provide for the addition of a unit of entry length to two of the addresses in the H register. The other purpose is to provide a test to determine whether or not the particular merge routine involved is to be terminated.

With reference to the addition, it is seen that a unit is added to the H register content, using flip-flop A12, by the equations $H_0=A_{12}H_2'+A_{12}'H_2$ and ${}_0a_{12}=A_{12}H_2'C$. This is interpreted as meaning that output proposition $H_0$ from diode network 125 (Fig. 8) simultaneously observes the contents of flip-flops H2 and A12. When they are different, as when adding (1+0), the equation is satisfied and a 1 is recorded in the H register. When they are the same, as when adding (0+0) or (1+1), the equation is not satisfied and a 0 is recorded in the H register. Flip-flop A12 goes false at the end of the first clock period during which flip-flop H2 has been false and flip-flop A12 has been true, and remains false for the remainder of the counting period. The result of this operation is that a unit is added to the H register content. It will next be shown that this addition is controlled to occur only for particular pulse positions of portions $m_3$ and $m_1$ or $m_2$ of the H register, the choice between the latter two as determined by the state of flip-flop A7.

It should be apparent that, on entering PC#360, if flip-flop A7 is false, the last entry recorded into the memory was from channel 12 and the $m_2$ address must be changed; but if flip-flop A7 is true, the last entry recorded into the memory was from channel 10 and the $m_1$ address must be changed. Furthermore, it should be noted that a new recording address must be set up in the $m_3$ portion of the H register. However, regardless of the portions of the H register to be affected, it has been pointed out that increments are made in units of entry length, employing flip-flop A12. It is for this reason that recirculation of the entry length code in flip-flops A1 to A6 occurs in PC#360.

Regarding the equation:

$$a_{12}=A_2'[A_1(O_{0-1}+A_7'O_{4-5}+A_7O_{8-9})+A_7'O_3P_2+A_7O_7P_2]C$$

more particularly and noting that additions are made to the H register content only by virtue of a true status in flip-flop A12, it is first seen that a high state of the term $A_2'A_1O_{0-1}C$ corresponds to the last time-wise binary digit position of the entry length code which is high (an exception is the code for an entry length of one word, but which has already been considered in connection with PC#357). Thus, flip-flop A12 can be set true at these times only, thereby adding a unit to the $2^0$, $2^1$, or $2^2$ position of the $m_3$ portion of the H register.

It is next seen that the terms $A_2'A_7'O_3P_2C$ and $A_2'A_7O_7P_2C$ operate to initially set flip-flop A12 true before the occurrence of the $m_2$ and $m_1$ portions of the H register in arithmetic unit 114, in a fashion similar to the preset by the equation $a_{12}=A_1'O_0P_0C$ in PC#357.

Lastly, the terms $A_2'A_1A_7'O_{4-5}C$ and $A_2'A_1A_7O_{8-9}$ operate to trigger flip-flop A12 during $m_2$ (if $A_7$ is false) and $m_1$ (if $A_7$ is true), respectively, of the H register.

Thus, by means of the above equation, if the entry length is one word, a unit is added in the $2^0$ place of an address; if the entry length is two words, a unit is added in the $2^1$ place of an address; if the entry length is four words, a unit is added in the $2^2$ place of an address; and if the entry length is eight words, a unit is added in the $2^3$ place of an address.

With reference to the test performed in PC#360 whereby it is determined whether or not the particular merge operation is to terminate, utilization is made of flip-flops A9, A10, A11, and K1. The former three, respectively, test the $m_3$, $m_2$, and $m_1$ portions of the H register, and the last-mentioned responds to the states of these flip-flops to cause the computer either to count to the rest condition to await further instructions if the test succeeds or to skip back to PC#345 and conduct an additional merge if the test fails.

Since flip-flops A9, A10, and A11 each perform in essentially the same manner, reference will be made for illustration to the activity of flip-flop A9. It will be recalled that, in PC#357, this flip-flop was preset to the true state. In PC#360, the equation $$_0a_9=(G_2H_2'+G_2'H_2)O_{0-3}C$$

compares, during the $m_3$ portion of the word period, flip-flop G2 (the G register) and flip-flop H2 (the H register); and when they are different, sets flip-flop A9 false. As mentioned, recirculating in the G register (Fig. 19) are the terminal addresses for the merge routine in process. More particularly, the $m_3$ portion of the G register contains the address of the memory arc to store the first word of the last entry to be merged. The $m_3$ portion of the H register (Fig. 20) commenced the merge routine with the address of the memory arc to store the first word of the first entry to be merged. As has been noted, an entry length has been added to this address for each entry merged. Thus, when the addresses in the $m^3$ portions of the G and H registers are equal, the merge routine must be terminated.

Similar reasoning may be applied to the activity of flip-flops A10 and A11. The former will remain true through PC#360 if the $m_2$ portions of the G and H registers are equal, or if flip-flop A7 is true indicating that an entry with an $m_1$ address has just been recorded; and the latter will remain true through PC#360 if the $m_1$ portions of the G and H registers are equal, or if flip-flop A7 is false, indicating that an entry with an $m_2$ address has just been recorded.

The equation $k_1=A_9'A_{10}'A_{11}'O_{13}C$ triggers flip-flop K1 true, indicating that the merge routine is not yet to be terminated. This occurs only if all three flip-flops A9, A10, and A11 have been triggered false during PC#360; or, in other words, if at least one of the flip-flops A9, A10, and A11 remains true through PC#360, the indication is equality for at least one of the addresses in the $m_1$, $m_2$, and $m_3$ portions of the G and H registers, and the merge routine is to terminate.

Returning to PC#351, it will next be assumed that the condition /E/</J/ or the condition /E/=/J/ (and flip-flop A7 is false) has been found in PC#351 and the sequence from PC#352 through PC#354 is conducted prior to entering PC#355.

For the merge routine, recording into the memory is done from the J buffer register; that is, when it is determined that the sorting digits of a sort control word indicate that the entry of which this sort control word is a part is to be routed into the memory, the entry, if it is not already recirculating in the J buffer register, is first transferred thereto and then recorded.

The satisfying of either of the conditions mentioned above in PC#351 thus requires that the entry whose sort control word is in the E register be transferred to the J buffer register. Concomitantly, since the sort control word of the entry already occupying the J buffer register must continue to be accessible for further comparisons, it is transferred to the E register for recirculation. These functions are the primary ones performed in PC#s 352 to 354.

In PC#352, the memory channel specified either in the $m_1^c$ or $m_2^c$ portions of the H register (depending on the state of flip-flop A7) is located, as in PC#345, and a count to PC#353 is made.

In each word period of PC#353, it is the function of flip-flop A11 to indicate whether or not the next word to enter arithmetic unit 114 will be a sort control word. If this is so, flip-flop A11 remains false as set at the end of the previous word period; otherwise flip-flop A11 is set true. This determination is made during period $O_{4-5}$ by comparing the H register content with arc addresses when flip-flop A1 is true. The comparison alone, as previously mentioned, will indicate the address of the memory arc containing a sort control word, i.e., indicates all sort control words in a memory channel. Making the comparison effective to set flip-flop A11 true only when flip-flop A1 is true selectively indicates the sort control word of the entry presently recirculating in the J buffer register. The state of flip-flop A11 is utilized by flip-flop A12, which is set false at the end of each word period in which the activity of PC#353 is repeated and the search for the proper sort control word is being conducted, and is set true at the end of the last word period of PC#353, during which the proper sort control word is found: $_0a_{12}=K_1O_{13}P_2C$; $a_{12}=A_{11}'K_1'O_{13}P_2C$.

Similar to PC#346, already discussed, the function of the equations governing flip-flop K1 is to provide for a count to PC#354 when location is made of the first word of the entry to be routed into the J buffer register as a replacement for the entry presently recirculating therein.

In PC#354, the equation $E_0=A_{12}'E_2+A_{12}J_2$ provides for recirculation in the E register (flip-flop A12 is false) for each word period except that for which the proper sort control word is routed thereto from the J buffer register (flip-flop A12 is true). Identification of this sort control word by flip-flops A11 and A12 is continued as in PC#353.

Also, by means of the equation $J_0=M_1$, the entry whose sort control word was previously in the E register is routed from the memory into the J buffer register.

As discussed in connection with PC#357, the equations for triggering flip-flop K1 provide for counting to PC#355 when the activity of PC#354 has been conducted a number of times equal to the entry length.

The sequence from PC#355 to the end of the merge routine has already been detailed.

It should now be apparent after having described in detail each of the word blocks shown in the flow diagrams of Figs. 15*b* to 15*e* that certain operations and, therefore, certain forms of the proposition equations occur repeatedly in several of the word time blocks. As previously discussed, it is not necessary to repeatedly generate a logical combination of terms, since the combination may be logically multiplied by the program counter numbers which define when it is to be operative.

Figs. 23 to 36 have been referred to as showing the final composite equations and diode networks which have been devised for completely defining the action of each of the logical output propositions mentioned in connection with Fig. 8. Fig. 28 presents the program counter sums heretofore referred to. Figs. 23 to 27 and 29 to 31 present the computer flip-flops relevant to the merge routine, showing the block diagrams and physical circuitry represented in the complete equations for the grid triggering propositions. For example, it is noted from Figs. 25 and 25*a* that the overall $k_1$ and $_0k_1$ equations can be considered to be made up of a plurality of individual logical product and sum terms separated and specified by function in Fig. 25 and combined in Fig. 25*a* into a final sum equation for which the complete diode networks are given. It should be understood that only a portion of the composite network is made operative at a time, said portion being determined by which of the outputs of program counter 115 is at the high potential.

An illustration of the merge routine of the present invention will next be given with particular reference to Figs. 16 through 22. These figures are concerned with an accounting system set up for a retail selling operation by a chain store company. Individual sales within the stores are recorded at the point of transaction on a medium, such as tape. These sales tapes are collected at periodic intervals and brought to the computer at the store accounting center for processing preliminary to preparing a daily selling report and up-to-date inventory record. Generally, the order in which the information is stored on the tapes and the order in which the information must be presented by the computer are different; exceptions to the general case occur very infrequently and are not handled differently by the system.

In the example shown in the figures, the chain store company requires a daily summary of its transactions by items such as department, sales clerk, stock number, number of sales, manufacturer, style, color, and size for each of its stores. This information for each transaction comprises one entry on the tapes, and each of these items is represented by a number and set up in the entry in binary form.

For purposes of simplification in the example, it will be assumed that one such tape contains four entries and another contains three entries and that the entries of the former are sorted with reference to the stock number code located in the second word of each entry and recorded on channel 10 of the computer memory, and that the entries of the latter are similarly sorted and recorded on channel 12 of the computer memory. As shown in Fig. 22, the entries occupy successive storage registers and, for this case, four storage registers are required for each entry. For convenience of reference, the stock numbers of the respective entries shown in Fig. 22 are expressed in decimal notation. For the example, the entries of channel 10 are programmed to occupy arcs 1000 to 1017, inclusive, and those of channel 12 are programmed to occupy arcs 1214 to 1227, inclusive. It is desired to merge these entries into one sorted group of entries to occupy arcs 1500 to 1533.

The merge command which will sequence the computer to perform a merge routine for this purpose is shown in Fig. 16.

Here it is seen that period $O_{12-13}$ is reserved for the merge instruction, a code which sequences the computer through routines which prepare for merging. Primarily, this preparation takes the form of setting up the various recirculating registers, and then causing the computer to enter PC#341, the first program counter block of the merge routine. Period $O_{8-11}$ of the command contains the address 0700, which has been programmed with the entry length code for four words, 000 011, in period $O_{0-1}$; the contents of this arc have been transferred to the E register and appear therein as shown in Fig. 17. Period $O_{4-7}$ of the command contains the address 0701, which has been programmed with binary digit ones in period $O_{2-4}$ to correspond with the location of the stock number code in the sort control word (Figs. 18 and 21). The sort control words, it is noted from Fig. 22, is the second word of each entry. The contents of arc 0701 have been set up in the F register as shown. Period $O_{0-3}$ of the command contains the address 0775, the contents of which are shown in Fig. 19 and have been transferred to the G. register. Thus, in periods $O_{8-11}$and $O_{4-7}$ of the G register appear the addresses of the last sort control words, 1015 and 1225, respectively, to enter the merge routine, and in periods $O_{0-3}$ appears the address of the arc to store the first word of the last entry to be merged (1530). Further, arc 0777 has been programmed to contain the initial merging addresses as shown in Fig. 20 and this content has been set up in the H register.

Thus, during PC#341 of Fig. 15*b*, flip-flops A1 to A6 are set up with the entry length code in the E register by triggering the grids of flip-flops A1, A2, and A3 such that flip-flops A1 and A2 are true and flip-flop A3 is false. Flip-flops A4, A5, and A6 remain false. The entry length code thus is contained in flip-flops A1 to A6 as well as in the E register, the latter being employed to set flip-flop V2 false (flip-flop V1 remains true) thereby energizing gating circuits 116 (Fig. 1) to gate the output of read head 4 of the J buffer register (Fig. 9) to arithmetic unit 114.

During PC#342 and 343, the address specified in the $m_1$ portion of the H register is looked up. It is noted that this address, 1001, contains the first sort control word to enter the merge routine. It is also noted that the E register content (the entry length code 000 011 in period $O_{0-1}$) is lost due to non-recirculation of this register.

During PC#344, the channel 10 sort control word (contents of arc 1001) is routed into the E register. It is noted that the magnitude of the stock number contained in this word is 261.

In PC#s 345 to 347 (Fig. 15*c*), the first entry of channel 12 to enter the merge routine is looked up (employing the address of its sort control word, 1215, appearing in portion $m_2$ of the H register) and is transferred to the J buffer register without disturbing the order of words in the entry. Thus the computer sticks in PC#347 for four word periods. It is noted that the magnitude of the stock number in the sort control word here is 209.

During PC#350, a look-up is made of the sort control word in the J buffer register.

Thus, when PC#351 (Fig. 15*d*) is entered, the sort control words in the E and J buffer registers are about to pass through arithmetic unit 114. During this word period, the sorting digits, as defined by the F register, are compared; and, since those of the E register are the larger, flip-flop K1 is set true. Flip-flop A7 remains false. The computer skips to PC#355.

In PC#355 and 356, the first recording address, 1500, in portion $m_3$ of the H register, is looked up. The record flip-flop R1 is turned on, thereby causing gating circuits 167 (Fig. 1) to pass recording propositions $R_o$ and $R_o'$ from arithmetic unit 114 to the head of channel 15.

The computer enters PC#357 and remains therein for four word periods, during which the four words of the J buffer register are routed into arcs 1500 to 1503 in sequence. Thus, the first entry of channel 12 becomes the first merged entry (Fig. 22). Flip-flop R1 is set false, thereby closing gating circuits 167. Flip-flops A9, A10, and A11 are set true for subsequent use, and since one-word entries are not involved, flip-flop A12 is set false.

In PC#360, the addresses in the G and H registers, respectively, are compared, and since equality is not shown for the $m_1$, $m_2$ or $m_3$ portions, flip-flops A9, A10, and A11 are set false, thereby causing flip-flop K1 to be set true at the end of the word period; the test for terminating conditions has failed. The addresses in the $m_2$ and $m_3$ portions of the H register are increased by four, the former to 1221 and the latter to 1504. A skip back to PC#345 is made.

As in the prior merge, the sequence from PC#345 to PC#351 locates a channel 12 entry, in arcs 1220 to 1223, inclusive, and sets up the J buffer register to correspond therewith. The comparison during PC#351 indicates that the stock number, 280, of this entry exceeds in magnitude, the stock number, 261, of the E register. As a result, flip-flop K1 is set false and flip-flop A7 is set true. A count to PC#352 is made.

It is noted that, if on leaving PC#351, flip-flop A7 is true, it is an indication that the entry to be recorded originated in channel 10; but if flip-flop A7 is false, it is an indication that the entry to be recorded originated in channel 12. Thus, in PC#s 352 and 353, the address of the first entry in channel 10, 1000 to 1003, and the sort control word of the J buffer register are looked up and, when found, a count to PC#354 is made. In PC#354, the channel 10 entry is transferred to the J buffer register and the channel 12 sort control word (originating in arc 1221) is set up in the E register.

The sequence from PC#355 to PC#357 records the channel 10 entry into arcs 1504 to 1507.

In PC#360, the test for terminating conditions again fails. The addresses in the $m_1$ and $m_3$ portions of the H register are increased by four, the former to 1005 and the latter to 1510. A skip back to PC#345 is made.

The entry in arcs 1004 to 1007 is next routed into the J buffer register. The comparison now indicates that its stock number, 280, is equal to that in the E register. As noted, in the event of equality, it is preferable to record the entry originating in channel 10 prior to that originating in channel 12. As a result, flip-flop A7 remains true, PC#s 352 to 354 are skipped and the channel 10 entry recorded in arcs 1510 to 1513. The test for terminating conditions again fails. The addresses in the $m_1$ and $m_3$ portions of the H register are increased, the former to 1011 and the latter to 1514. The computer skips back to PC#345.

The entry in arcs 1010 to 1013 is routed into the J buffer register. Its stock number, 289, exceeds that in the register, 280. Flip-flop A7 is set false, the sequence from PC#352 to PC#354 transfers the entry originally in arcs 1220 to 1223 to the J buffer register and the sort control word of arc 1011 to the E register. The J buffer register content is recorded in arcs 1514 to 1517. The test for termination fails. The addresses in portions $m_2$ and $m_3$ of the H register are increased to 1225 and 1520, respectively. A skip back to PC#345 is made.

The last entry of channel 12, in arcs 1224 to 1227, is set up in the J buffer register. Since its stock number, 312, exceeds that in the E register, the sort control word with arc 1225 as origin is set up in the E register and the entry of 1010 to 1013 is set up in the J buffer register. Flip-flop A7 is triggered true. Arcs 1520 to 1523 receive the entry originally in arcs 1010 to 1013.

During PC#360, the address in the $m_2$ portion of the H register is 1225, which, it will be recalled from Fig. 19, is also the address in the $m_2$ portion of the G register. This equality prevents flip-flop A10 from being triggered false. In other words, the test has been successful and this merge routine is to be terminated. This is accomplished by a count out of PC#360.

It is to be observed that the merge routine described above has not completed the merge operation, the object of which is to merge all entries in channels 10 and 12 to form one group of sorted entries. It is noted that, in the example, the last entry in each channel has been excluded. It should be obvious that these entries may be merged by programming an additional merge command into the computer, and setting up the G register with terminal addresses larger than the addresses of the last entries in channels 10 and 12, such as 1021 for the $m_1$ portion and 1232 for the $m_2$ portion. Additionally, it is to be noted that the merge operation could have been completed by use of the original command (i.e., in one merge routine) if such addresses had been inserted therein, thereby causing the test for termination to be successful when the last entry is routed into arcs 1530 to 1533.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. A system for merging two groups of numbers, comprising: a cyclical memory for storage of coded signals representing the numbers such that the groups are each separate, the numbers in each group being stored in sorted order so as to be made successively available in accordance with a predetermined relationship between the magnitudes of the coded signals representing the numbers; a first recirculating register synchronized with said memory; means for setting up said first recirculating register with coded signals representing a number of one group; a second recirculating register synchronized with said memory; means for setting up said second recirculating register with coded signals representing a number of the other group; means for comparing the coded signals in said recirculating registers to determine whether the coded signals in said second recirculating register bears said predetermined magnitude relationship with respect to the coded signals in said first recirculating register; means effective if said predetermined relationship does not exist to reset each recirculating register with coded signals representing the number in the other recirculating register, to cause such predetermined relationship to exist; means for storing the number represented by the coded signals of said second recirculating register into said memory to form a third sorted group; and means to reset said second recirculating register with coded signals representing the next number from the group which provided the last number stored in the third group.

2. A system for merging two groups of previously sorted numbers, comprising: a cyclical memory for storage of coded signals representing the two groups of numbers, the numbers in each group being stored in sorted order so as to be successively available in accordance with the magnitude of the coded signals representing the numbers; a first recirculating register synchronized with said memory; means for setting up in said first recirculating register coded signals representing the smallest magnitude number in one of the groups stored in said memory; a second recirculating register synchronized with said memory; means for setting up in said second recirculating register coded signals representing the smallest magnitude number in the other of the groups stored in said memory; means for comparing the coded signals of said recirculating registers; means for storing in said memory as a third group the number whose coded signals are determined by said comparing means to be the smaller; and means to reset one of the recirculating registers with coded signals representing the next smallest magnitude number of the group from which the coded signals stored back in the memory originated.

3. In a digital computer having a cyclical memory with groups of words stored therein, the words of each group being arranged in sets sorted with respect to datum contained in one of the words of the set, the datum being identified as the sorting datum and the word containing the sorting datum being identified as the sort control word, a system for merging the two groups of words, comprising: memory channels on said memory for storage of each of said sorted groups; a one-word recirculating register timed to advance with said memory; a multi-word recirculating register timed to advance with said memory, said multi-word register having a word capacity corresponding to the number of words in a set; means to set up said one-word register to correspond with the sort control word of the first group with the smallest sorting datum; means to set up said multi-word register to correspond with the set of the second group whose sort control word contains the smallest sorting datum; means to compare the sorting data of the registers; means operable to transfer the sort control word in said multi-word register to said one-word register and including further means operable to transfer the set corresponding to the sort control word in said one-word register from the memory to said multi-word register only if the sorting datum in said one-word register is shown by said comparing means to be smaller than the sorting datum in said multi-word register; memory channels in said memory for storage of a merged group of sets of words; means to record into said storage channels the set presently in said multi-word register; and means to set up in said multi-word register the next set from the group from which the previous set recorded in said storage channels originated.

4. A merging system for the cyclical memory of a digital computer containing entries in sorted order, each entry comprising an equal number of words, the entries being recorded in groups in channels of the memory, and the entries of a group being in sorted order with regard to data in the same respective portion of the same respective word thereof, comprising: a recirculating register synchronized with the memory; means to sequentially set up said recirculating register with the sorting data of the entry of a group; a buffer register recirculating in synchronism with the memory; means to sequentially set up said buffer register with the entry of another group; a comparator to compare the sorting data in said registers; transfer means responsive to the output of said comparator to set up said recirculating register with the sorting data in said buffer register and including further means to set up said buffer register with the entry whose sorting data is in said recirculating register, said transfer means being effective only if the sorting data originally in said recirculating register is shown by said comparator to be smaller than the sorting data originally in said buffer register; means to record into another channel of the memory the entry so set up in said buffer register; and means to select the entry next to be set up in said buffer register from the group which provided the entry last recorded.

5. In a digital computer with a cyclical memory, a merging routine for entries contained therein, each entry comprising an equal number of words identified by a code on an address channel of the memory, the entries being recorded in groups in channels of the memory, and the entries of a group being in sorted order with regard to data in the same respective portion of a sort control word thereof, comprising: a one-word register recirculating in synchronism with the memory; network means to sequentially set up said one-word register with the digits of the sort control word of the first entry in a first channel; a buffer register recirculating in synchronism with the memory; means to set the word capacity of said buffer register to correspond with the number of words contained in an entry; network means to sequentially set up said buffer register with the digits of the first entry in a second channel; a comparator to compare the digits in said registers corresponding to the sorting data; transfer means operable to set up said one-word register with the digits of the sort controlled word of the entry in said buffer register and to set up said buffer register with the digits of the first entry in the first channel if said comparator indicates the sorting data digits in said one-word register are smaller than the sorting data digits in said buffer register; means to record into a third channel of the memory the words of the entry set up in said buffer register, said means being operative subsequent to operation of said comparator; and means to select the next entry to be set up in said buffer register from the channel which provided the entry last recorded.

6. In a digital computer with a cyclical memory, a merging routine for entries contained therein, each entry comprising an equal number of words identified by a code on an address channel of the memory, the entries being recorded in groups in channels of the memory, and the entries of a group being in sorted order with regard to data in the same respective portion of a sort control word thereof, comprising: a one-word register recirculating in synchronism with the memory; network means to sequentially set up said one-word register with the digits of the sort control word of the first entry in a first channel; a buffer register recirculating in synchronism with the memory; means to set the word capacity of said buffer register to correspond with the number of words contained in an entry; network means to sequentially set up said buffer register with the digits of the first entry in a second channel; a comparator to compare the digits in said registers corresponding to the sorting data; transfer means operable to set up said one-word register with the digits of the sort control word of the entry in said buffer register and further operable to set up said buffer register with the digits of the first entry in the first channel if said comparator indicates the sorting data digits in said one-word register are smaller than or equal to the sorting data digits in said buffer register; means to record into a third channel of the memory the words of the entry set up in said buffer register, said means being operative subsequent to operation of said comparator; means to select the next entry to be set up in said buffer register from the channel providing the entry which has last been recorded; storage means cooperating with said memory for storing a code representing the addresses of the sort control words of the last entries in each of said first and second channels; and means for terminating the merging routine when the address of the last entry recorded corresponds to the address stored in said storage means.

7. A computer merging system capable of merging entries of different word lengths in accordance with sorting datum located in any of the positions selected entry, comprising: a cyclical memory in which coded digits representing a first and second group of sorted entries are stored; a first storage means cooperating with said memory to store a code defining the number of words in an entry; a second storage means cooperating with said memory to store a code defining the positions in the entries occupied by the sorting datum; a multi-word register cooperating with said memory and capable of having its word capacity set in accordance with the entry length code in said first storage means; a one-word register cooperating with said memory; means for setting up in said one-word register the word of an entry from one of the groups, said word including the sorting datum of the entry; means for setting up in said multi-word register all the words of an entry from the other group; means utilizing the code in said second storage means to compare the sorting datum in said registers to determine their relative magnitude; means for replacing the entry in said multi-word register by the entry corresponding to the sorting datum in said one-word register if the comparing means indicates the sorting datum originally in the multi-word register is larger in magnitude; and means for recording the entry in said multi-word register back into said memory to form a third group of entries.

8. In a digital computer, an electrical system for merging a plurality of groups of data entries stored in a cyclical memory of the computer in the form of coded digit signals, each entry containing an item of selected data and the entries of each group being previously separately classified in accordance with the relationship between the magnitude of the selected data in different entries of a group, including: two data recirculating registers operating in synchronism with the cyclical memory; circuitry for initially setting up a first of said registers with coded digit signals representative of the selected data of an entry from one of the groups and for initially setting up the second of said registers with coded digit signals representative of a complete entry from another group; a comparator for effecting a comparison between the items of selected data set up in the two recirculating registers to determine whether the item in the second register bears a predetermined relationship with respect to the item in the first register; further circuitry controlled, when such predetermined relationship does not exist, in accordance with the state of the comparator, for transferring the item of selected data of the complete entry set up in the second register into the first register and for transferring the complete entry containing the selected data set up in the first register into the second register to cause such predetermined relationship to exist; recording apparatus for transferring the complete entry set up in the second register on to the memory when such predetermined relationship exists; and resetting circuitry for setting up the second register with an entry from the group which contained the item previously transferred so as to allow a further and subsequent comparison to be effected whereby by means of the recording apparatus a third group of classified entries is formed in the memory of the computer.

9. A system for merging a plurality of groups of previously sorted entries stored in the cyclical memory of a digital computer according to claim 8, including additional circuitry responsive to the comparison between the two items of selected data whereby when the two items are identical in magnitude the complete entry containing a predetermined one of the items of selected data is transferred to the memory direct from the second register when such predetermined item is located in the second register, and when the predetermined item is located in the first register, after the transfer of the complete entry containing such predetermined item to the second register.

10. In a digital computer, an electrical system for merging a plurality of groups of data entries, comprising a cyclical memory having a plurality of data storage channels located thereon, a pair of said data storage channels each having stored thereon in the form of coded digit signals a group of data entries containing items of selected data previously sorted with respect to one of the items; a first and a second data recirculating register operating in synchronism with said memory; logical circuitry interconnecting the two channels and the two recirculating registers for initially setting up in the first register that item of selected data of the first entry stored in one channel and for initially setting up in the second register the complete first entry containing that item of selected data stored in the other channel; a comparison device for effecting a comparison between the two items of selected data; a gating circuit responsive to the comparison for transferring the complete entry set up in the second register to a third data storage channel on the memory when such predetermined relationship exists; a compensating logical circuit for transferring selected data set up in the second register to the first register and for transferring the complete entry containing the selected data set up in the first register to the second register when such predetermined relationship does not exist so as to achieve such predetermined relationship and effect the subsequent transfer of the complete entry set up on the second register to the third data storage channel; and further logical circuitry for transferring to the second register the next complete entry from that one of the pair of channels from which the previous complete entry transferred to the third channel originated.

11. A data merging system according to claim 10, including an address channel on said cyclical memory having coded signals permanently recorded thereon indicative of the addresses of the storage locations of the memory channels; a third recirculating register adapted to contain coded signals indicative of the addresses of the locations in the channels of the selected data to be compared and the data transfer address of the location in the third channel to which, after comparison, an entry is to be transferred; a channel selector device having a plurality of possible states indicative of the memory channels; a control device adapted according to the state thereof to determine from which channel of the pair of channels a complete entry is to be set up in the second register; and circuit means for comparing the outputs of the third recirculating register and the address channel, for applying input signals to the channel selector device and for interconnecting the output of the channel selector device and the pair of channels so as to set up the first and second registers with an item of selected data and a complete entry respectively in accordance with the addresses specified in the third recirculating register and as determined by the state of the control device.

12. A system for merging presorted data according to claim 10, including an address channel on said cyclical memory having coded signals permanently recorded thereon indicative of the addresses of the storage locations of the memory channels; a cyclical register adapted to be set according to the entry length; a third recirculating register adapted to contain coded signals indicative of the addresses of the locations in the channels of the selected data to be compared and the data transfer address of the location in the third channel to which, after comparison, an entry is to be transferred; a fourth recirculating register operating in synchronism with the memory and adapted to contain the addresses of the last items of selected data on the pair of channels to be merged; a counting control device having a state determined by the content of said cyclical register and adapted to add a unit to the data transfer address of the third recirculating register and to add a unit to either of the remaining addresses in the third recirculating register according to the state of the control device; a merge terminating device interconnecting the third and fourth recirculating registers and adapted to compare the addresses located therein for equality; and a decision element adapted to be controlled according to the result of the comparison so as to effect a termination of the merging operation or condition circuitry to cause a further complete entry to be set up in the second recirculating register.

13. A data merging system according to claim 10, including an address channel on said cyclical memory having coded signals permanently recorded thereon indicative of the addresses of the storage locations of the memory channels; a third recirculating register adapted to contain coded signals indicative of the addresses of the locations in the channels of the selected data to be compared and the data transfer address of the location in the third channel to which, after comparison, an entry is to be transferred; a channel selector device having a plurality of possible states indicative of the memory channels; a cyclical register adapted to be set according to the entry length; a control device adapted according to the state thereof to determine from which channel of the pair of channels a complete entry is to be set up in the second register; and a logical comparator circuit for comparing the addresses of the address channel and the third recirculating register to locate the position of the selected data to be compared, and the cyclical register having associated therewith a modifying element adapted to modify the addresses in the third recirculating register in accordance with the entry length set up in the cyclical register whereby the first word of a data entry in that channel of the pair of channels determined by the state of the control device, is located for subsequent transfer to the second recirculating register irrespective of the position of the selected data in the entry.

References Cited in the file of this patent

UNITED STATES PATENTS

| | | |
|---|---|---|
| 2,604,262 | Phelps | July 22, 1952 |
| 2,674,733 | Robbins | Apr. 6, 1954 |
| 2,701,095 | Stibitz | Feb. 1, 1955 |
| 2,735,082 | Goldberg et al. | Feb. 14, 1956 |
| 2,737,342 | Nelson | Mar. 6, 1956 |
| 2,739,299 | Burkhart | Mar. 20, 1956 |
| 2,770,797 | Hamilton et al. | Nov. 13, 1956 |
| 2,789,759 | Tootill et al. | Apr. 23, 1957 |
| 2,798,216 | Goldberg et al. | July 2, 1957 |

FOREIGN PATENTS

| | | |
|---|---|---|
| 1,056,750 | France | Oct. 21, 1953 |
| 736,144 | Great Britain | Sept. 7, 1955 |

OTHER REFERENCES

A Functional Description of the EDVAC, Moore School of Elec. Eng., University of Pennsylvania, Nov. 1, 1949, vol. I, pages 1–1 to 1–8, vol. II, Figure 104–10LD–6.

UNITED STATES PATENT OFFICE

CERTIFICATE OF CORRECTION

Patent No. 2,947,976 August 2, 1960

Myron J. Mendelson et al.

It is hereby certified that error appears in the printed specification of the above numbered patent requiring correction and that the said Letters Patent should read as corrected below.

Column 10, line 73, for "11" read -- 115 --; column 12, line 75, after "tube" insert -- 135 --; column 19, line 3, for "is", first occurrence, read -- it --; column 21, line 28, for "$=K_{1'}O_{13}P_2C$" read -- $=A_7K_{1'}O_{13}P_2C$ --.

Signed and sealed this 31st day of January 1961.

(SEAL)
Attest:
KARL H. AXLINE
Attesting Officer

ROBERT C. WATSON
Commissioner of Patents